(12) United States Patent
Ruffenach et al.

(10) Patent No.: US 10,719,204 B2
(45) Date of Patent: Jul. 21, 2020

(54) DOCUMENT SELECTION AND DISPLAY BASED ON DETECTED VIEWER PREFERENCES

(71) Applicant: Apple Inc., Cupertino, CA (US)

(72) Inventors: Collin D. Ruffenach, Portland, OR (US); Dominic J. Hughes, Cupertino, CA (US); Ian J. Elseth, Vancouver, WA (US); Steve E. Marmon, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 663 days.

(21) Appl. No.: 15/273,943

(22) Filed: Sep. 23, 2016

(65) Prior Publication Data

US 2017/0199942 A1   Jul. 13, 2017

Related U.S. Application Data

(60) Provisional application No. 62/310,751, filed on Mar. 20, 2016, provisional application No. 62/276,919, filed on Jan. 10, 2016.

(51) Int. Cl.
| | |
|---|---|
| *G06F 16/335* | (2019.01) |
| *G06F 40/106* | (2020.01) |
| *G06F 40/166* | (2020.01) |
| *G06F 3/0484* | (2013.01) |

(52) U.S. Cl.
CPC ........ *G06F 3/04842* (2013.01); *G06F 16/335* (2019.01); *G06F 40/106* (2020.01); *G06F 40/166* (2020.01)

(58) Field of Classification Search
CPC .... G06F 3/0482; G06F 17/212; G06F 17/248; G06F 17/2755; G06F 17/30699

USPC .......... 707/E17.109, 748, 737, E17.005, 749
See application file for complete search history.

(56) References Cited

U.S. PATENT DOCUMENTS

| | | | |
|---|---|---|---|
| 9,165,305 B1 | 10/2015 | Chandra et al. | |
| 9,195,753 B1 | 11/2015 | King et al. | |
| 2003/0028520 A1* | 2/2003 | Alpha | G06F 16/24578 |
| 2010/0094867 A1* | 4/2010 | Badros | G06Q 30/02 |
| | | | 707/725 |
| 2013/0060787 A1* | 3/2013 | Doshi | G06Q 10/06 |
| | | | 707/749 |

(Continued)

*Primary Examiner* — Robert W Beausoliel, Jr.
*Assistant Examiner* — Pedro J Santos
(74) *Attorney, Agent, or Firm* — Flecther Yoder, P.C.

(57) ABSTRACT

Some embodiments of the invention provide a method that detects document attribute preferences for viewing documents (e.g., articles) on a device. The method displays several documents on a display screen of the device, with each document having one or more associated attributes. In some embodiments, different documents can be associated with the same attribute or the same number of attributes, or can be associated with different attributes or a different number of attributes. In some embodiments, the method detects viewer interactions with one or more displayed documents, and based on these interactions, computes attribute scores for several attributes associated with a number of the documents. The computed attribute scores identify a preference ranking for attributes associated with the documents. Some embodiments use the computed attribute scores to select subsequent documents for display on the device and/or to arrange the display of subsequent documents on the device.

25 Claims, 13 Drawing Sheets

(56) References Cited

U.S. PATENT DOCUMENTS

2013/0326406 A1  12/2013  Reiley et al.
2014/0108153 A1   4/2014  Matus
2016/0344828 A1*  11/2016  Hausler ............. G06F 17/30011

* cited by examiner

DOCUMENT SELECTION AND DISPLAY BASED ON DETECTED VIEWER PREFERENCES

BACKGROUND

Content aggregators gather various electronic documents from various sources and publishers. The gathered documents can be articles that relate to a variety of different topics. Content aggregators typically provide summaries of a selected subset of the gathered documents on a document summary page. Typically, the selected subset of the gathered documents is not narrowly tailored to the viewer's interests. As such, the viewer is often presented with document summaries that the viewer does not find interesting.

Moreover, many of the present content aggregators do not protect the privacy of their viewer's interests. In fact, most aggregators today try to monetize on what they identify about the viewer's reading interests, by using the identified interest to augment the viewer's profile, which they then use to provide more-directed advertising to the user.

SUMMARY

Some embodiments of the invention provide a method that detects document attribute preferences for viewing documents (e.g., articles) on a device. The method displays several documents on a display screen of the device, with each document having one or more associated attributes. In some embodiments, different documents can be associated with the same attribute or the same number of attributes, or can be associated with different attributes or a different number of attributes. In some embodiments, the method detects viewer interactions with one or more displayed documents, and based on these interactions, computes attribute scores for several attributes associated with a number of the documents. The computed attribute scores in some embodiments identify a preference ranking for attributes associated with the documents. As further describe below, some embodiments use the computed attribute scores to select subsequent documents for display on the device and/or to arrange the display of subsequent documents on the device.

In some embodiments, the method detects viewer interactions with document summaries that are displayed on the device's display screen. Selection of a document summary in some embodiments directs the device to display the document associated with the selected document summary. In some embodiments, the viewer interactions for a displayed document can include (1) placing the document's summary in a field of view on the display screen for a first threshold period of time, and (2) selecting the document's summary and viewing the document on the display screen for a second threshold period of time. The first and second threshold periods of time are different in some embodiments. Also, the second threshold period of time can be zero in some embodiments, while it has to be a non-zero number in other embodiments.

The method of some embodiments detects viewer interactions by detecting a first larger set of interactions with the documents, and translating the first larger set of interactions to a second smaller set of interactions. In some embodiments, the first set of interactions includes the second smaller set of interactions as well as other interactions. In some embodiments, the method computes the attribute scores based on the second smaller set of interactions, and not on the other interactions of the first set of interactions that are not in the second smaller interaction set. The interactions in the second smaller set are indicative of different levels of preferences for viewing the documents in some embodiments. In some embodiments, the second smaller set of interactions includes viewing summaries of the documents and selecting summaries of documents to view the documents, while the first larger set of interactions includes not only these two interactions but also other interactions, such as sharing a viewed document with another device, expressly identifying a favorable rating for a viewed document, etc.

In some embodiments, the document attributes include topic identifiers. A topic identifier that is associated with a document specifies a topic to which the document relates. In some embodiments, a document can be associated with two or more topic identifiers in order to specify more than one topic to which the document relates. In addition, in some embodiments, some topics can be sub-topics of other topics. The document attributes in some embodiments include publisher identifiers, with each publisher identifier identifying the publisher of a document.

The document attributes in some embodiments include several visual characteristic attributes that express visual-capture features of the document that visually engage a viewer to capture the viewer's attention. In some embodiments, visual characteristic attributes can include one or more of the following attributes for article documents: (1) attributes that express types of headlines provided by the documents, (2) attributes that express types of headline photos used by the documents, and (3) attributes that express the background color of headline photos used by the documents. In these or other embodiments, the visual characteristic attributes include attributes that specify whether the document uses parallax or cinemagraph presentations. In some embodiments, the document attributes are part of document metadata provided by a set of servers (e.g., by the server set that provide the documents to the device). This metadata in some cases expresses qualities of headline characters or images of the document.

In some embodiments, the device is a first device that is related to a second device. In some of these embodiments, the first device transmits the computed attribute scores to the second device so that the second device can use these scores in selecting the documents that it displays and/or in the manner in which it displays the documents. In some embodiments, the second device receives the documents from the same source (e.g., the same server set) as the first device. In some embodiments, the first and second devices are devices associated with one account for receiving documents. In these or other embodiments, the first and second devices are devices owned by one user. The second device in some embodiments aggregates the received attribute scores with attribute scores that the second device generates on its own. In some embodiments, the second device also transmits its computed attribute scores to the first device for the first device to aggregate with its attribute scores.

The first device computes its attribute scores by aggregating (e.g., adding) attribute scores for newer interactions that it detects with attribute scores that it previously computed for previous older interactions. In some embodiments, the newer interactions are with respect to a newer set of displayed documents while the older interactions are with respect to an older set of displayed documents. The first device in some embodiments aggregates attribute scores by reducing attribute scores for older interactions based on a decay parameter before combining (e.g., adding) the attribute scores for older interactions with attribute scores for newer interactions.

As described above, some embodiments use the computed attribute scores to select subsequent documents for display on the device and/or to arrange the display of subsequent documents on the device. The method of some embodiments initially identifies a set of candidate documents for display, when a set of one or more servers provides to the device the candidate documents or metadata about these candidate documents. Each candidate document is associated with a set of attributes such as the above-described attributes, e.g., a publisher attribute, one or more topic attributes, one or more visual characteristic attributes, one or more title or headline attributes, etc. In some embodiments, the device receives from the server set the document attributes along with the received candidate documents or the received candidate document metadata. The document attributes in some embodiments are part of the received candidate document metadata.

The method of some embodiments generates a customized score for each candidate document by using the previously computed attribute scores for the attributes associated with the candidate documents. In some embodiments, the attribute scores computed on the device are based on previous interactions with documents previously displayed on the device. In some embodiments, the method generates the customized scores not only based on the attribute scores that it computes based on interactions with previous documents on the device, but also based on prior interactions with previous documents displayed on one or more other devices related to the device, as discussed above. The method in some embodiments selects a subset of the candidate documents for display on the device based on the generated customized scores. In these or other embodiments, the method generates a layout of the summaries of the documents based on the generated customized scores.

In some embodiments, the method generates the customized score for a document by reducing the score for each document attribute by a default attribute score, and then aggregating the reduced attribute scores to generate the customized score. In some embodiments, the default attribute score is computed based on a default level of interaction with any document on the device. In some embodiments, the method aggregates the reduced attribute scores for a document by multiplying each reduced attribute score by a confidence weight value that expresses a quality of the interaction sample size. Given that one document can have more associated attributes than another document, the method in some embodiments democratizes the aggregation of the reduced attribute scores by reducing contribution of a subset of attribute scores in an attribute score set when the attribute score set has too many scores for too many attributes.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawings.

BRIEF DESCRIPTION OF DRAWINGS

The novel features of the invention are set forth in the appended claims. However, for purposes of explanation, several embodiments of the invention are set forth in the following figures.

FIG. 6 illustrates an example of an impression, while

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method that detects document attribute preferences for viewing documents (e.g., articles, webpages, etc.) on a device. The method displays several documents on a display screen of the device, with each document having one or more associated attributes. In some embodiments, the method detects viewer interactions with one or more displayed documents, and based on these interactions, computes attribute scores for several attributes associated with a number of documents. The computed attribute scores in some embodiments identify a preference ranking for attributes associated with the documents. As further described below, some embodiments use the computed attribute scores to select subsequent documents for display on the device and/or to arrange the display of subsequent documents on the device.

Figure 1:
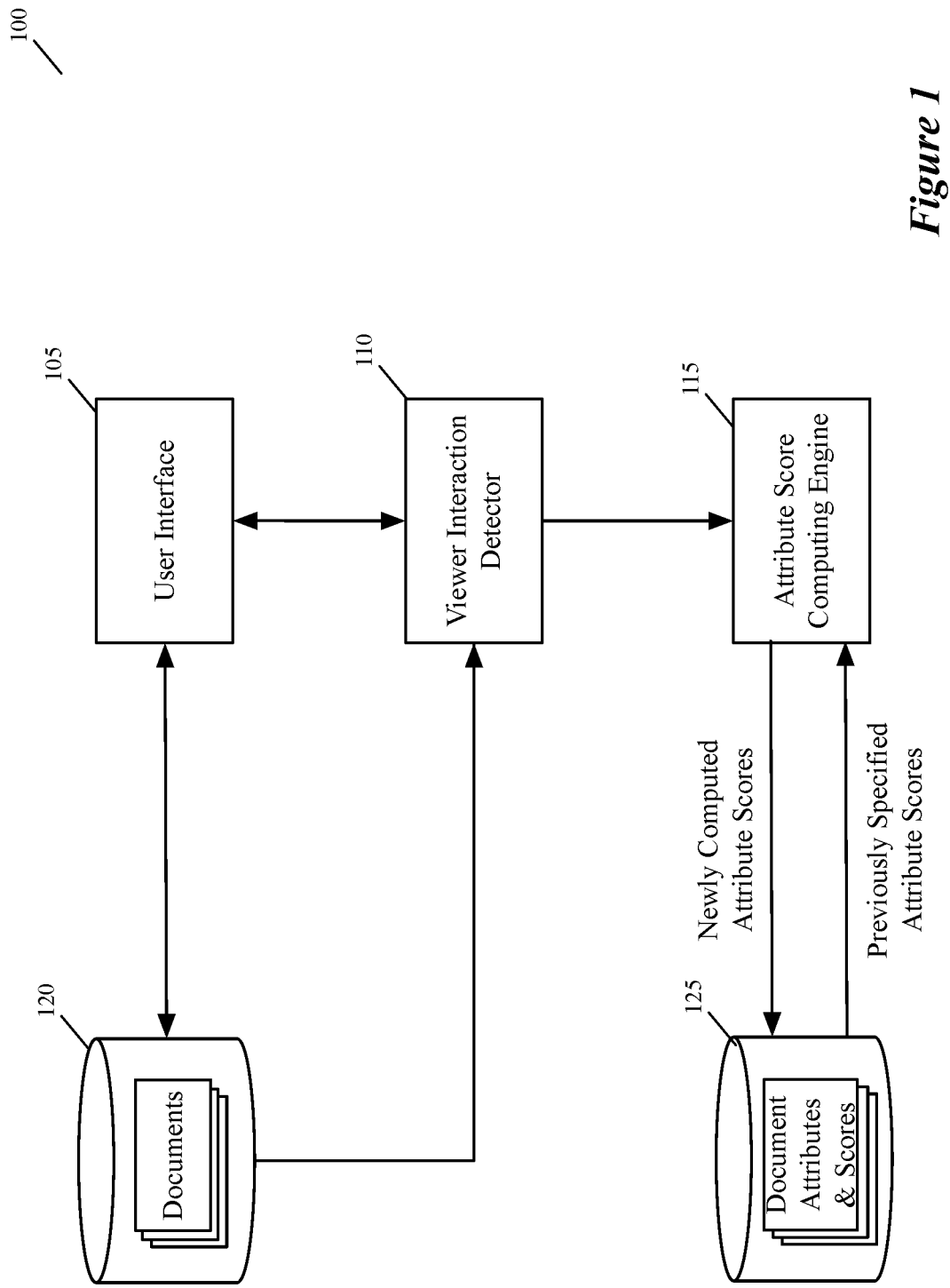
FIG. 1 illustrates a document reader that implements the method of some embodiments for detecting document attribute preferences of a viewer.

FIG. 1 illustrates a document reader 100 that implements the method of some embodiments for detecting document attribute preferences of a viewer. The document reader 100 is an application that executes on a computing device that receives documents for a set of one or more servers and displays these documents on a display screen. Examples of such a computing device include a computer (e.g., desktop or laptop), a mobile device (e.g., a tablet or smartphone), etc. In some embodiments, the document reader 100 is a stand-alone application, while in other embodiments, the document reader is part of the device's operating system framework. The document reader 100 in some embodiments is the user-facing front end of a content aggregator that also includes several back-end server modules. These server modules aggregate content based on system-configured settings and/or user-specified preferences (e.g., preferences for types of articles), and provide the aggregated content to the device through a network.

As shown, the document reader 100 includes a user interface (UI) module 105, a viewer interaction-detecting module 110, an attribute score-computing engine 115, a document storage 120, and a document-attribute storage 125. The document storage 120 stores documents that the document reader 100 receives from the server set, while the document attribute storage 125 stores attributes that are associated with the documents and scores for these attributes. In some embodiments, the document storage 120 stores for each of its stored documents one or more attribute identifiers that refer to one or more attributes in the attribute storage 125. Through these attribute identifiers, the reader can identify the corresponding attributes and attribute scores for a document.

The reader 100 stores the documents that it receives from the server set in the document storage 120. The documents in some embodiments are articles, webpages, and/or other documents (e.g., financial reports, corporate reports, etc.) that are accessible through a network (e.g., the Internet). In some embodiments, the received documents are associated with one or more document feeds that the reader specifies based on pre-configured settings of the reader and/or based on the user's selection of the feeds. The feeds in some embodiments include publisher-specific feeds (e.g., New York Times, ESPN, etc.) and topic-specific feeds (e.g., Economy, Politics, Sports, etc.). In some embodiments, the document storage 120 stores only summaries for some or all of the documents. In these embodiments, the reader retrieves the entire document once the document's displayed summary is selected by a user.

In some embodiments, the reader 100 receives from a server set a set of document attributes for each document that the reader receives, and stores these attribute sets in the attribute storage 125. For instance, in some embodiments, the document attributes are part of document metadata provided by a set of servers (e.g., by the server set that provided the documents to the device). The metadata in some cases expresses visual characteristic qualities of the document as well as the topics and publisher of the document. In some embodiments, different documents can be associated with the same attribute or the same number of attributes, or can be associated with different attributes or a different number of attributes. The metadata received from the server in some embodiments includes server-generated global scores for a document. In some of these embodiments, the server-generated global-scores are based on scores associated with the document's publisher, visual characteristics, and/or other document characteristics (e.g., type of headline, etc.).

Figure 2:
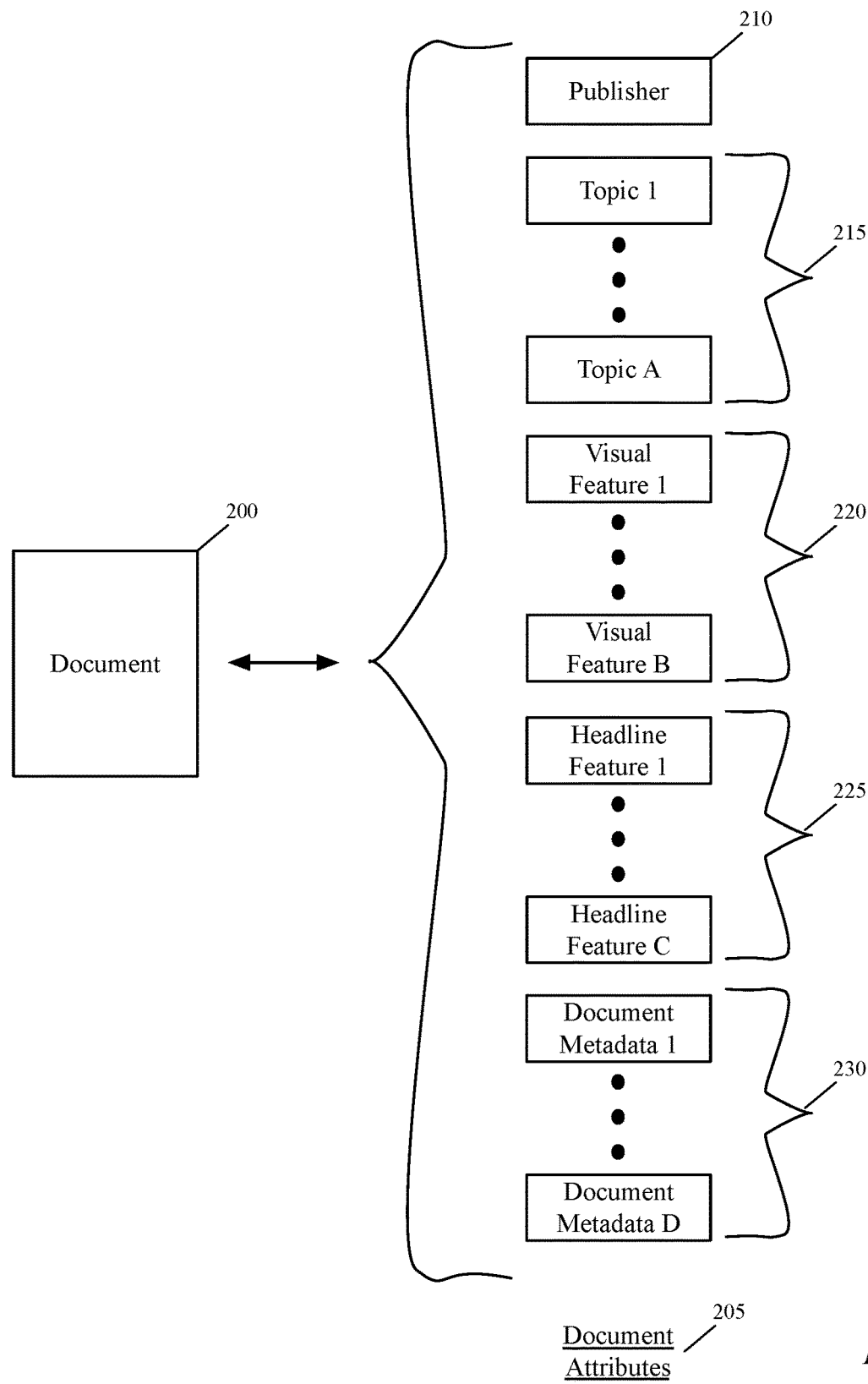
FIG. 2 illustrates examples of a set of attributes that can be associated with a document in some embodiments.

FIG. 2 illustrates examples of a set of attributes 205 that can be associated with a document 200 in some embodiments. As shown, the document 200 is associated with a publisher attribute 210, a set of one or more topic attributes 215, a set of one or more visual characteristic attributes 220, a set of one or more title or headline attributes 225, and a set of one or more other document metadata 230. The publisher identifier 210 identifies the publisher of a document. In some embodiments, examples of publishers are news publications (e.g., New York Times, LA Times, etc.), magazines (e.g., Motor Trend, etc.), television channels (e.g., ESPN, CNN, etc.), blog publishers, etc.

A topic attribute 215 that is associated with a document specifies a topic to which the document relates. In some embodiments, a document can be associated with one or more topic identifiers 215 that specify one or more topics to which the document relates. In addition, in some embodiments, some topics can be sub-topics of other topics. For example, an article might be associated with both an NFL topic identifier and a Raider topic identifier to designate that this article relates to professional football and to the Oakland Raiders. In some embodiments, the Raider topic identifier would be designated as a sub-topic (e.g., a child topic or otherwise related topic) of the NFL topic identifier. In other embodiments, these two topics (NFL and Raiders) would not have a parent-child relationship or any other association.

The visual characteristic attributes 220 express visual-capture features of the document that visually engage a viewer to capture the viewer's attention. In some embodiments, visual characteristic attributes can include one or more of the following attributes for documents: (1) attributes that express the types of images contained in the documents, (2) attributes that express the background color of the document images or of other portions of the document (including the background color of the entire document), (3) attributes that specify whether the documents use special effects or unique visual presentations, such as parallax effects or cinemagraph presentations, etc.

The headline attributes 225 express characteristics of the document titles or headlines. A document's headline or title often is one of the first features of the document that captures the viewer's attention. Hence, the headline or title is a good feature to analyze to ascertain a viewer's preferences. In some embodiments, the headline attributes 225 include one or more of the following attributes: (1) attributes that express types of headlines provided by the documents, (2) attributes that express types of headline photos used by the documents, and (3) attributes that express the background color of headline photos used by the documents.

Some embodiments analyze other document metadata attributes 230 to identify viewer preferences. For instance, in some embodiments, the reader 100 can display articles that are defined based on a document format that is native to the reader, or articles that are defined based on standardized formats (e.g., web-based formats, such as HTML). In some such embodiments, a document's metadata attributes 230 include a format attribute that describes the document's format (e.g., as a native format or one of several standardized formats). In some embodiments, the reader 100 does not receive some or all of the visual attributes 220, headline attributes 225 and/or the other document metadata 230 from the server set. In some embodiments, the reader receives a global score for the document from the server set, which computes this score based on one or more of the visual attributes 220, headline attributes 225 and/or the other document metadata 230 from the server set.

The UI module 105 manages the display of the documents on a display screen of the device (e.g., on a display screen of the mobile device) or on a display screen connected to the device (e.g., on a display screen coupled to a desktop computer). In some embodiments, the displayed documents are presented on one or more document summary pages that display only summaries of the documents. The documents in some embodiments are articles, webpages, and/or other documents that one or more data sources publish through the Internet. In some of these embodiments, the reader generates the summaries of the published documents from the published document content. A document's summary in some embodiments includes a headline and source identifier. The document's summary can also include in these embodiments an image from the document and an additional description regarding the document (e.g., excerpts from the document).

The viewer interaction detector 110 interacts with the UI module 105 to detect viewer interactions with document that are displayed on the device's display screen. For example, in some embodiments, selection of a document summary in some embodiments directs the device to display the document associated with the selected document summary. In some of these embodiments, the viewer interaction detector 110 for a displayed document can detect the placement of the document's summary in a field of view on the display screen for a first threshold period of time. In some embodiments, the field of view on the display screen is a display area (e.g., display window) that is not partially or fully occluded by another display area (e.g., another display window) on the display screen. In some embodiments, the viewer interaction detector 110 for a displayed document can also detect the selection of the document's summary and the subsequent viewing of the document on the display screen for a second threshold period of time. The first and second threshold periods of time are different in some embodiments. The second threshold period of time can be zero in some embodiments, while it has to be a non-zero number in other embodiments.

In the discussion below, the placement of the document's summary in a field of view on the display screen for a first threshold period of time is referred to as a "document impression" or "impression," while the selection of the document's summary and the subsequent viewing of the document on the display screen for a second threshold period of time is referred to as a "document click," or "click." To detect an impression or a click, the viewer interaction detector 110 receives notification from the UI module 105 each time the content in the displayed field of view of the reader application changes, e.g., each time the document summary page scrolls through this field of view, or each time the summary page is replaced with a document page that displays one document after the selection of the document's summary on the summary page.

Whenever a document's summary on a document summary page scrolls into the reader's field of view, the interaction detector 110 of some embodiments starts a timer to measure the duration that the document's summary is displayed in the reader's field of view. If the duration exceed the first threshold period of time before the document's summary is scrolled off the reader's field of view (or before the device's screen is turned off or the reader is pushed to the background behind another application), the interaction detector 110 of some embodiments records an impression for each tracked attribute of the document with the summary displayed in the reader's field of view. A tracked attribute of a document is an attribute of the document for which the attribute-scoring engine 115 computes a score.

Whenever a document page replaces a document summary page in the reader's field of view, the interaction detector 110 of some embodiments starts a timer to measure the duration that the document page is displayed in the reader's field of view. If the duration exceeds the second threshold period of time before the field of view is changed to another document page or to the document summary page (or before the device's screen is turned off or the reader is pushed to the background behind another application), the interaction detector 110 of some embodiments directs the attribute scoring engine 115 to record a document click for each tracked attribute of the document displayed in the reader's field of view. In some embodiments, the interaction detector 110 identifies each attribute associated with a document through the document's attribute identifier(s), which the detector 110 retrieves from the document storage 120. The attribute-scoring engine 115 records the impressions and clicks for each attribute in the attribute storage 125. Specifically, for each tracked attribute, the reader maintains an impression score and a click score in the attribute storage 125 in some embodiments.

In addition to impressions and clicks, the interaction detector 110 in some embodiments detects other viewer activity with respect to a displayed document and their associated document attributes. Examples of these other activities include: (1) subscribing to a document feed that is associated with a set of one or more document attributes, (2) indicating liking or disliking a document, (3) sharing a document with another device (e.g., emailing the document or a link to the document to another user), (4) saving a document, (5) entering a document feed. In some embodiments, attributes are not only associated with documents but are also associated with document feeds.

In some embodiments, the interaction detector 110 directs the attribute scoring engine 115 to maintain one or more scores regarding one or more of these other tracked interactions (e.g., liking, sharing, etc.). However, in other embodiments, the interaction detector 110 normalizes all of the interactions to impressions, clicks or both. For example, in several embodiments described below, the interaction detector 110 transforms each detected interaction for an attribute that is neither an impression nor a click to an impression score and a click score, and then directs the attribute-scoring engine 115 to use these impression and click scores to increment the attribute's overall impression and click scores. In other embodiments, the attribute score-computing engine 115 transforms each non-impression, non-click interaction into an impression score and/or click score.

Some embodiments transform all non-impression, non-click interactions to impression and click scores because the attribute-scoring engine 115 in these embodiments computes each attribute's score in terms of just these two parameters. For example, some embodiments compute an overall score for each attribute as the attribute's click score divided by the attribute's impression score.

Figure 3:
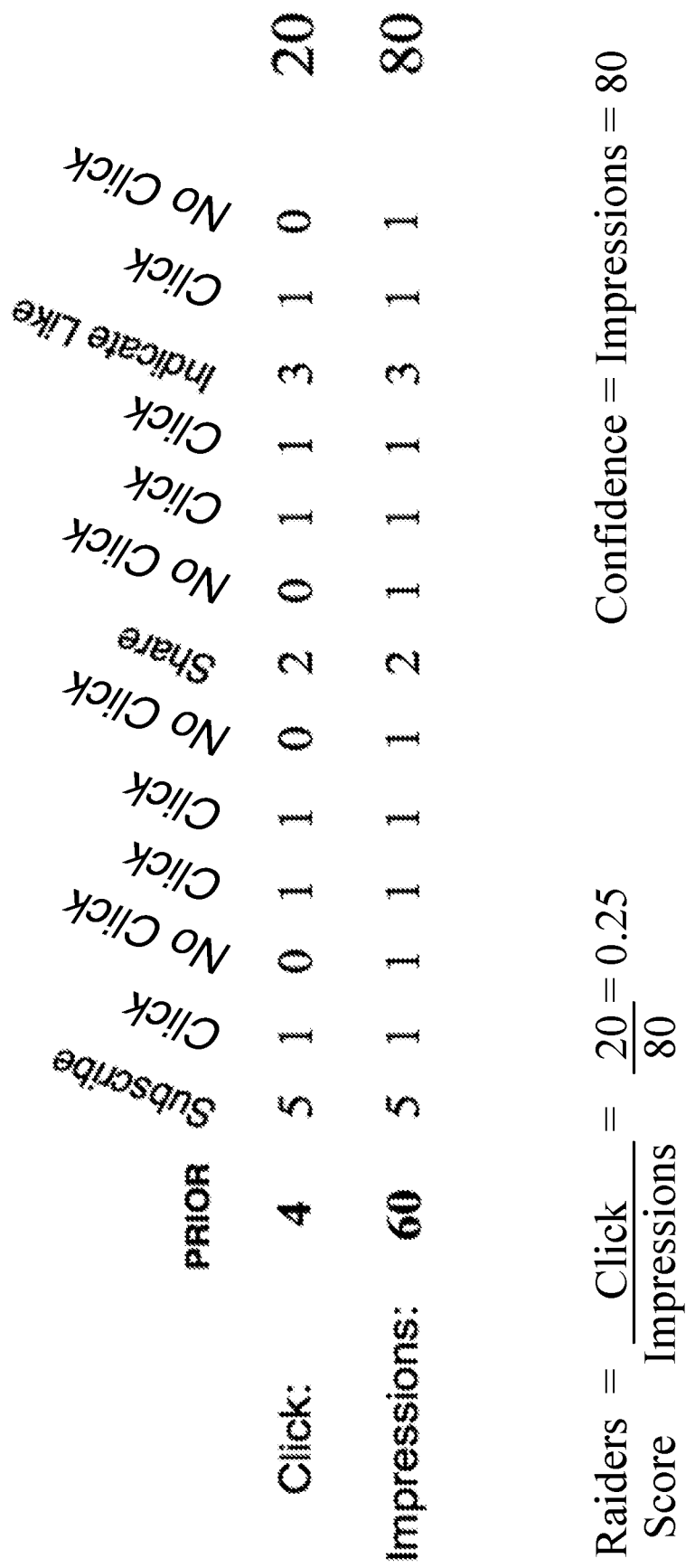
FIG. 3 presents an example that illustrates how attribute-scoring engine of some embodiments computes a score for an attribute.

FIG. 3 presents an example that illustrates how attribute-scoring engine 115 of some embodiments computes a score for an attribute. In this example, the attribute is a topic identifier for the Oakland Raiders. This example shows a series of interactions that include impressions of documents tagged with the Raiders topic identifier, clicks on documents tagged with the Raiders topic identifier, the subscription to a Raiders content feed, the sharing of one document tagged with a Raiders topic identifier, and the liking of another document tagged with the Raiders topic identifier. This series of interactions is over a duration of time with several documents that are associated with the Raiders topic identifier.

In this example, each click interaction has an associated impression interaction, and increments the Raiders topic identifier's click and impression scores by 1. On the other hand, each impression interaction does not always have an associated click interaction. As further shown, the interaction module translates: (1) the subscription interaction to five click values and five impression values, (2) the sharing interaction to two click values and two impression values, and (3) the liking interaction to three click values and three impression values.

In the example illustrated in FIG. 3, the series of displayed interactions are assumed to be the first series of interactions detected with respect to the Raiders topic identifier. As such, the attribute scoring engine starts with default click and impression scores (which in this example are 4 and 60) for this topic identifier so that the early interactions do not bias the attribute score too much. When the reader 100 has been sufficiently used on the device so that the scoring engine has enough samples to generate average click and impression scores for other attributes or other topic identifier attributes, the default click and impression scores are the average click and impression scores on the device (e.g., average click and impression scores for other attributes or other topic identifier attributes). On the other hand, when the reader 100 has not been sufficiently used on the device, the default click and impression scores are the click and impression scores that are pre-configured on the device or that are provided by the server set that supplies the documents and their associated attributes.

When the series of interactions are not the first series of detected interactions with respect to a document attribute, the baseline click and impression scores are updated based on the prior click and impression scores that the attribute-scoring engine 115 previously computed for the attribute. To update these values (or the default values), the scoring engine retrieves these values form the attribute storage 125. The attribute-scoring engine 115 can update the attribute's click and impression scores based on a single detected interaction that is processed individually, or based on multiple interactions that are processed in batch mode.

FIG. 3 illustrates that the attribute scoring engine 115 expresses the overall attribute score as the attribute's click score divided by the attributes impression score. In this example, the attribute score is 0.25, which is obtained by dividing 20 clicks by 80 impressions. One of ordinary skill will realize that other embodiments compute the attribute scores differently. FIG. 3 also illustrates that some embodiments use the impression score of an attribute as a confidence rating for the attribute score. Expressing the confidence rating in terms of the impression score allows the confidence rating to be associated with the sample size (i.e., to the number of instances in which a document that was associated with the attribute was displayed).

Although FIG. 3 equates the confidence rating of an attribute to its impression score, other embodiments use the attribute's impression score to derive its confidence rating but do not set the confidence rating to be equal to the impression score. For example, when a first attribute has 100 impressions while a second attribute has 10 impressions, some embodiments might have the confidence rating of the first attribute be 6 times that of the second attribute (instead of 10 times) because these embodiments do not linearly increase the confidence rating with the impressions but instead increase the confidence rating along with the impressions by using a decay parameter.

In using computed attribute scores to compute a score for a document that is subsequently analyzed for possible display, the reader of some embodiments uses the confidence ratings of the attributes as weighting factors for combining the various different attribute scores. In other words, the reader in some embodiments uses the confidence ratings of the attributes to relativize each attribute's contribution to the overall score of a document. This document scoring technique will be further described below.

To update a click or impression score based on the click or impression score of a new detected interaction, the attribute scoring engine reduces the previous click or impression scores based on a decay parameter before combining (e.g., adding) the previous click or impression score with the new click or impression score. Some embodiments use a decay parameter of 0.99, and the following Equations (A) and (B) for computing the new click and impression scores based on previous click and impression scores of an attribute and the click and impression scores of a detected interaction.

$$\text{New\_Click\_Score} = 0.99 * \text{Old\_Click\_Score} + \text{Interaction\_Click\_Score} \quad (A)$$

$$\text{New\_Impression\_Score} = 0.99 * \text{Old\_Impression\_Score} + \text{Interaction\_Impression\_Score} \quad (B)$$

Each of these equations expresses a geometric sum series that decays an old score for a variable by a decay parameter before incrementing it by a new score. In the above two equations, the decay parameter is 0.99. The value of a variable that is expressed as a geometric series is bounded by a particular value, which can be derived based on the following closed formula (often referred to as the closed formula for the sum of a geometric progression):

$$\text{Saturation Value} = 1/(1-M),$$

where M is the decay multiplier. Accordingly, for Equation (A) or (B), the saturation value for the click score or impression score is 100. Thus, the bounded value for click or impression score is 100. Some embodiments normalize the click and impression scores for an attribute to be between 0 and 1 by dividing the click and impression scores generated by Equations (A) and (B) by 100. These embodiments also normalize the confidence rating to be between 0 and 1 by dividing an initial confidence rating that is derived from the impression score by 100.

In some embodiments, the reader 100 stores the click, impression and overall scores for each attribute just on the device in the attribute storage 125. In these embodiments, these scores are not relayed to the server set that provides the documents and document attributes, in order to preserve the privacy of the user's document viewing preferences. In some of these embodiments, these scores are stored in an encrypted fashion on the device in order to further preserve the privacy of the viewer's document viewing preferences.

However, in some embodiments, the reader 100 does share the click, impression and/or overall scores for each attribute with other devices that are related to the device on which the reader executes. In some embodiments, two devices are related when they are associated with one account for receiving documents. In these or other embodiments, two devices are related when one user owns them.

To share these scores with another related device, the reader 100 in some embodiments uses cloud storage servers to relay the scores to the other device. When the other device is not connected to the cloud storage servers (e.g., is not connected to a network or does not have the reader application open), the scores temporarily are stored on the cloud storage servers until the other device can download the scores provided by the reader. While the scores are stored on the cloud storage servers on their way to the other device, the scores are stored in an encrypted format that prevents the scores from being deciphered by the cloud storage servers or other devices connected to these servers, and thereby preserves the privacy of the viewer's reading preferences. This encryption creates a private cloud in the cloud storage servers for the related devices to relay their computed attribute scores to each other.

Figure 4:
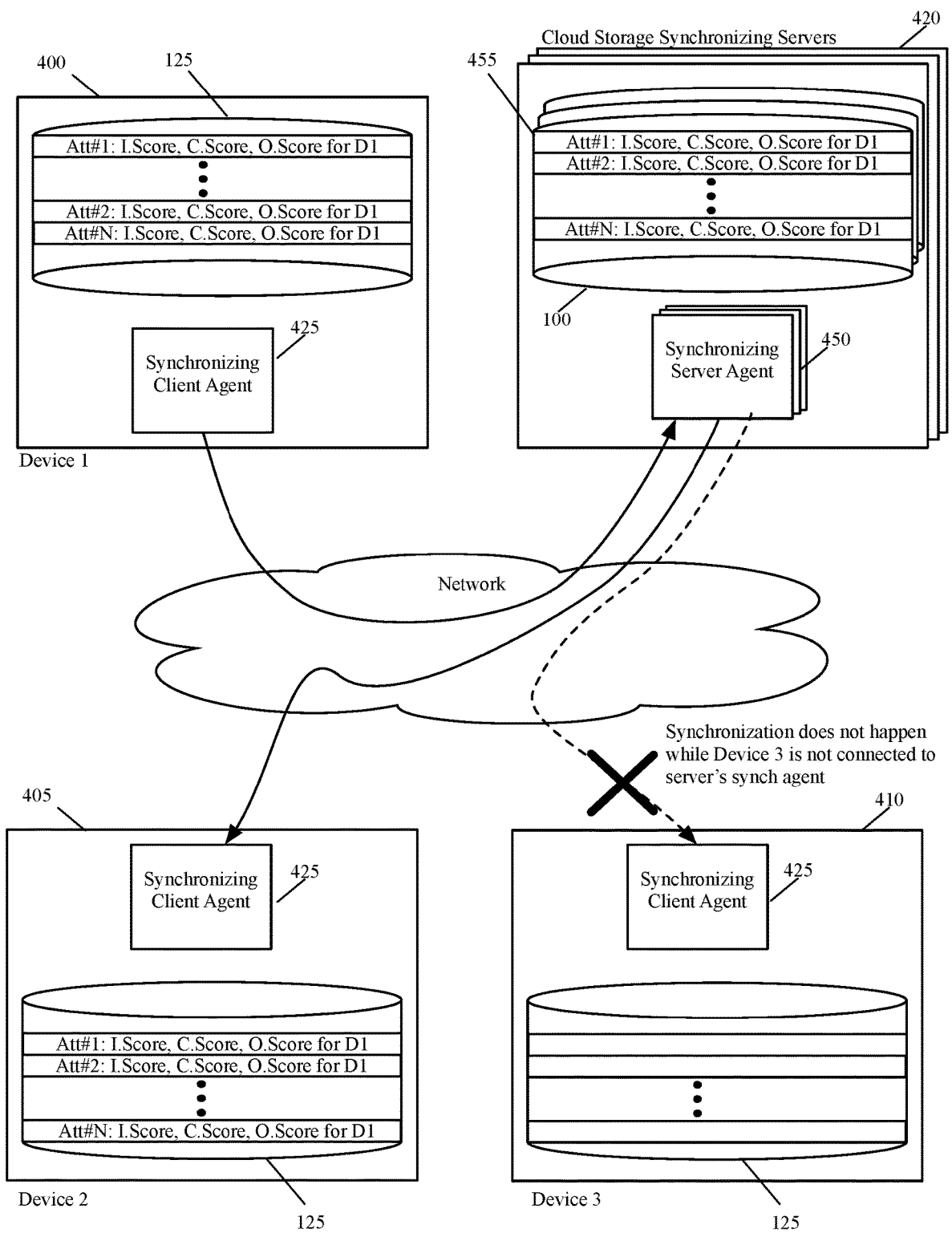
FIG. 4 illustrates an example of how a reader on one device relays its attribute scores to other related devices through a private cloud that is established for the related devices on a set of one or more cloud storage synchronization servers that is shared with other sets of related devices.

FIG. 4 illustrates an example of how a reader on one device 400 relays its attribute scores to other related devices 405 and 410 through a private cloud that is established for the related devices 400, 405 and 410 on a set of one or more cloud storage synchronization servers 420 that is shared with other sets of related devices (not shown). As shown, the devices and the cloud storage server 420 are connected through a network, which can include a local area network, a wide area network, wireless networks and/or the Internet.

In some embodiments, the devices 400-410 are related devices as they are associated with one account through which a set of servers provides documents to the reader applications executing on the devices for display. This server set includes the cloud storage serve set 420 in some embodiments, while it is separate from the cloud storage server set 420 in other embodiments. As shown, the reader 100 of each of the devices 405, 410 and 415 has a synchronizing client agent 425 and an attribute data storage 125, while the cloud storage servers 420 includes a synchronizing server agent 450 and a synchronizing attribute score data storage 455 for each set of related devices. In some embodiments, the cloud storage server set 420 has a different attribute score data storage 455 and synchronizing agent 450 for different sets of related devices. Also, in some embodiments, the synchronizing client agent 425 on each device 400-410 is an agent that operates outside of the reader, so that it can be used by other applications executing on the device.

As mentioned above, each device's attribute-scoring engine 115 computes impression scores, click scores, and overall scores for each attribute that is associated with a document with which a user interacts on the device. In addition, each device's synchronization agent relays newly computed or updated attribute scores, which are computed by its attribute-scoring engine 115 and stored in its attribute data storage 125, to the agents of other related devices through the synchronizing server agent 450. Each device's agent relays the newly computed or updated attribute scores in real time in some embodiments, while in other embodiments, it relays the newly computed or updated attribute scores in batch (e.g., periodically, or after a certain number of new or updated computations). As described above and further described below, the device agents 425 relays the attribute scores to the synchronizing server agents 450 in an encrypted format in order to preserve the confidentiality and privacy of the user document review preferences.

In some embodiments, the cloud storage server set 420 is simply a conduit through which the device synchronization agents 425 relay their newly computed or updated attribute scores. FIG. 4 illustrates an example that shows newly computed or updated attribute scores from the first device 400 being relayed to the second and third devices 405 and 410 through the cloud storage server set 420. One of ordinary skill will realize that the second and third devices 405 and 410 can also use the cloud storage server set 420 to relay attribute scores that they newly compute or update to the other related devices 400-410.

At the time that the first device 400 relays its update to the cloud storage server set 420 in the example illustrated in FIG. 4, the second device is connected to the cloud storage server set 420, while the third device 410 is not connected to the cloud storage server set 420. Hence, as shown, the cloud storage server set 420 in real-time supplies to the second device 405 the newly computed or updated attribute scores that it receives from the first device 400, while temporarily storing these attribute scores in its attribute data storage 455 until the third device 410 connects to the cloud storage sever set 420, at which time the server set 420 can provide these attribute scores to the third device 410.

In some embodiments, the devices and servers specify the attributes and each of the individual scores in terms of key value pairs. In these embodiments, the devices and servers relay the attributes and their associated scores in terms of key value pairs. These key value pairs are encrypted on the devices, in their transmission between the devices and the servers, and/or on the servers, in order to maintain this information as confidential and private so that only the related devices can access this information. Under this approach, not even the cloud storage server set 420 can decrypt the attributes or their associated scores in order to identify the document attributes that interest the user(s) of the related devices, or the scores associated with these attributes.

As further described below, the related devices 405 and 410 aggregate the attribute scores that they receive from the device 400 with corresponding attribute scores that the related devices 405 and 410 compute on their own, and then use the aggregate attribute scores to select subsequent documents for display and/or to define the layout of subsequently displayed documents (e.g., the layout of subsequent document summary pages). In some embodiments, related devices relay impression and click scores, and aggregate the impression and click scores that they receive from other devices with the impression and click scores that they compute.

For instance, to aggregate impression and click scores for an attribute, the second device 405 in some embodiments uses the following Equations (C) and (D):

$$\text{New\_Impression\_Score} = w1*\text{Own\_Impression\_Score} + w2*\text{First\_Device\_Impression\_Score} + w3*\text{Third\_Device\_Impression\_Score, and} \quad (C)$$

$$\text{New\_Click\_Score} = w4*\text{Own\_Click\_Score} + w5*\text{First\_Device\_Click\_Score} + w6*\text{Third\_Device\_Click\_Score.} \quad (D)$$

In these equations, w1-w6 are weighting parameters, the first device is device 400 and the third device is device 410, the own impression and click scores are the impression and click scores of the second device 405, the first device impression and click scores are the impression and click scores of the first device 400, and the third device impression and click scores are the impression and click scores of the third device 410. In some embodiments, the weighting parameter for each score is equal to the confidence rating of the parameter's associated score, as described above. Other embodiments reduce the weighting parameter for a score received from another device when the other device has a different screen size (e.g., on a tablet, these embodiments reduce the weighting parameter for an impression or click score that is received from a reader on a smartphone).

In some embodiments, each device uses the received impression and click scores from another device to augment its own impression and click scores, and then discards the received impression and click scores. In other embodiments, each device maintains multiple impression and click scores, and uses newly received impression and click scores from another device to obtain one of the pairs of impression and click scores that it maintains for the other device. The reader in some of these embodiments then uses each maintained impression and click score to generate an aggregate impression and click score (e.g., weighted sums) whenever it needs to compute an overall score for an attribute on its device.

For instance, when the set of related devices includes two tablets of different sizes and one smartphone, one of the tablets stores five pairs of impression and click scores in some embodiments. These five pairs are: (1) impression and click scores for landscape mode of the first tablet, (2) impression and click scores for portrait mode of the first tablet, (3) impression and click scores for landscape mode of the second tablet, (4) impression and click scores for portrait mode of the second tablet, and (5) impression and click scores for the smartphone.

In these embodiments, the first tablet can receive from the second tablet (through the cloud storage synchronization servers 420) updated impression and click scores for both the portrait and landscape modes of the second tablet. In this situation, the first tablet uses the received scores to update two pairs of impression and click scores that it maintains for the landscape and portrait modes of the second tablet. The reader of the first table in some embodiments generates aggregate impression and click scores by generating a weighted sum of the five pairs of impression and click scores that it maintains, whenever it needs to compute an overall score for an attribute on its device. In some embodiments, the reader reduces the weight of other devices (e.g., other sized devices) when it has captured a sufficiently large number of impression and click scores based on interactions that it detects on its own device.

Figure 5:
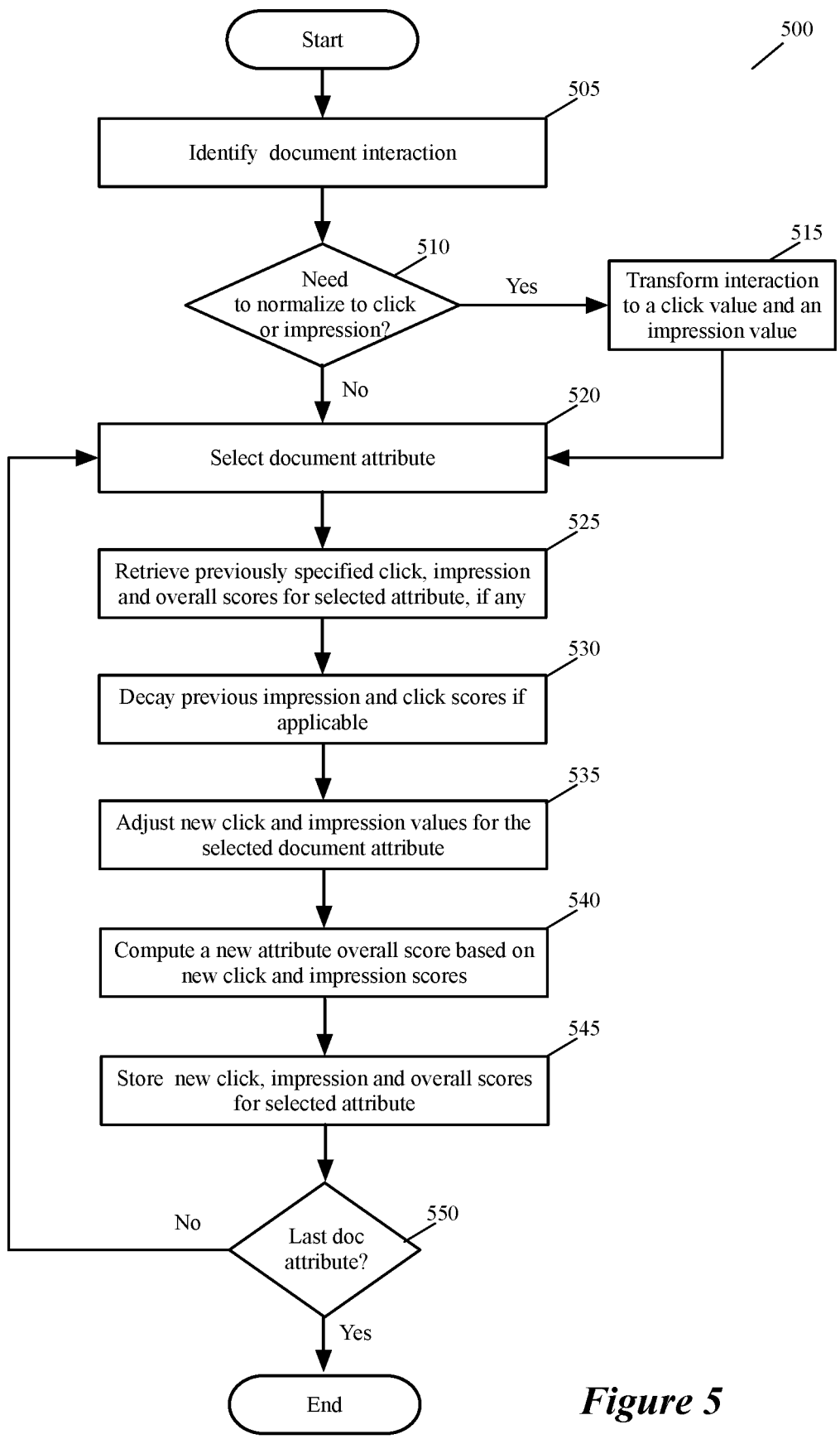
FIG. 5 conceptually illustrates a process that the reader application of a device performs when the interaction detector identifies a viewer interaction with respect to a document or a document feed that is associated with a set of attributes for which the process maintains a set of impression scores, a set of click scores and a set of overall scores.

Several processes that are performed by the cloud storage server set 420 and the reader applications of the related devices 400-410 will now be described by reference to FIGS. 5-10. FIG. 5 conceptually illustrates a process 500 that the reader application of a device (e.g., device 400) performs when the interaction detector 110 identifies (at 505) a viewer interaction with respect to a document or a document feed that is associated with a set of attributes for which the process maintains a set of impression scores, a set of click scores and a set of overall scores. Although the process 500 is shown for just one detected interaction, one of ordinary skill will realize that the scoring engine 115 of the reader application in other embodiments batch processes several detected document interactions sequentially. Hence, one of ordinary skill will realize that the series of operations of the process 500 are simply meant to illustrate one possible way of performing these operations. These operations can be performed in different sequences.

The interaction detected at 505 can be an impression, a click, or another interaction. In some embodiments, an impression is the viewing of a document summary for a first duration of time, while a click is the selection of the document's summary and viewing of the document summary for a second duration of time. Also, in some embodiments, the other interaction includes sharing a document, liking a document, subscribing to a document feed, saving a document, entering a document feed, etc.

Figure 6:
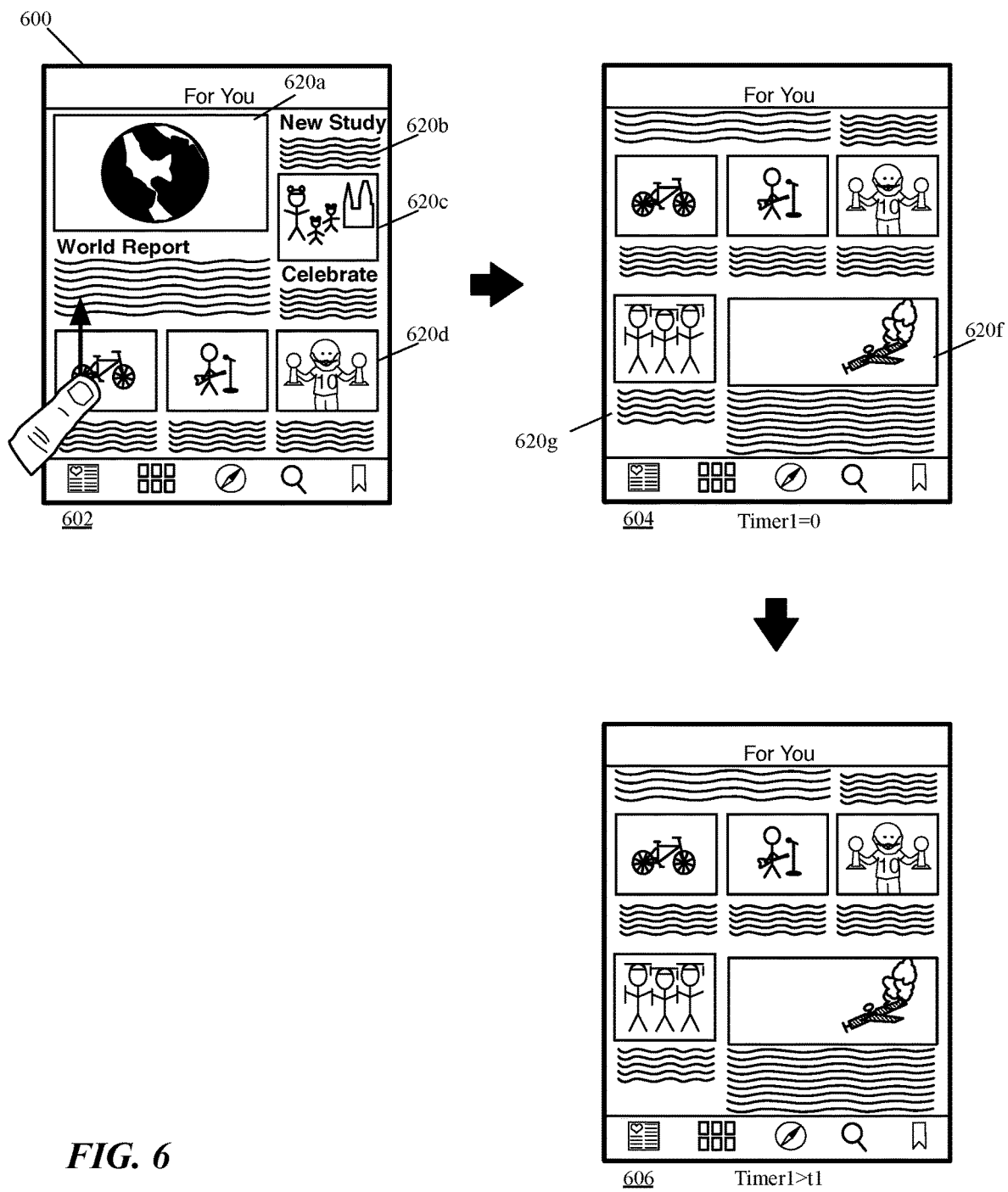
Figure 7:
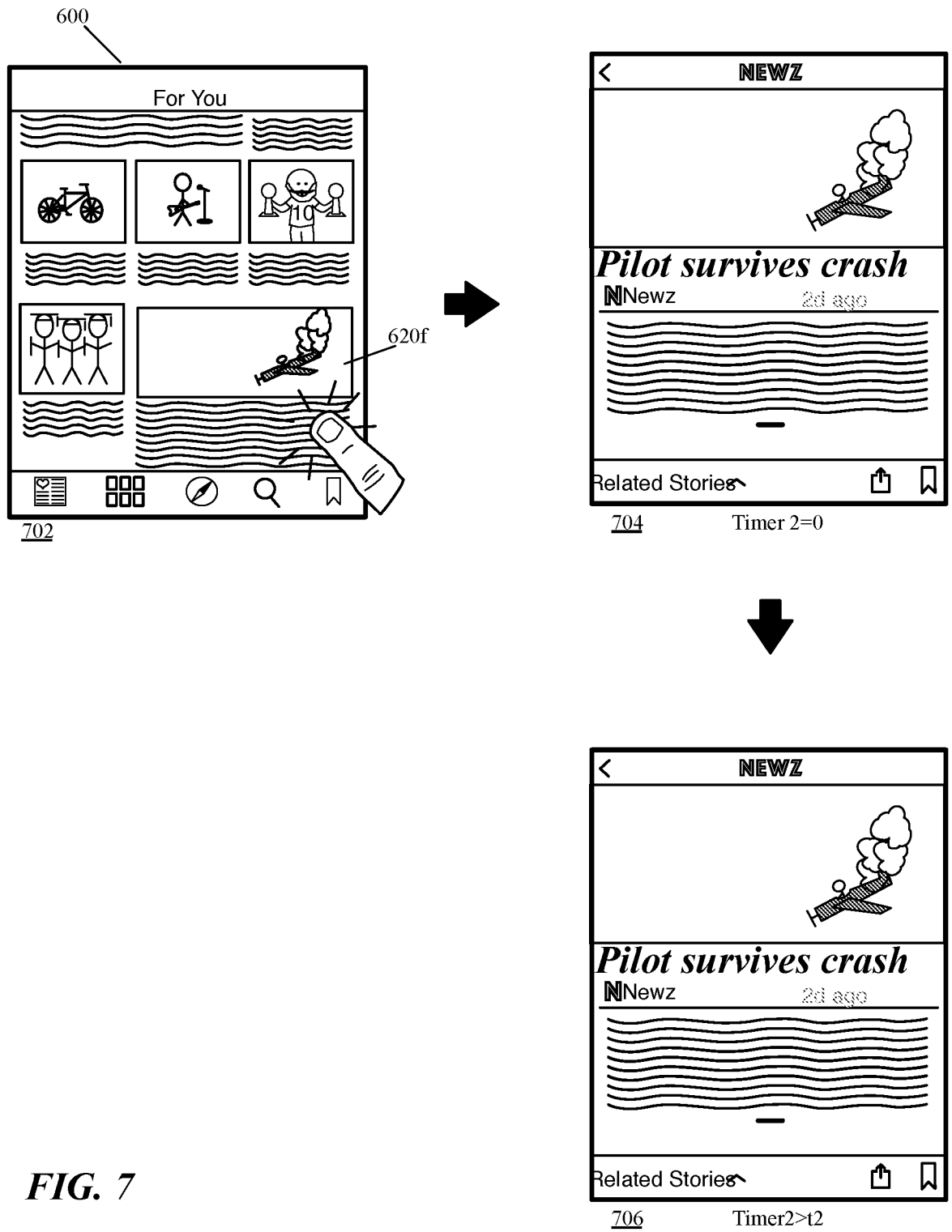
FIG. 7 illustrates an example of a click interaction, on a mobile device with a touch-sensitive screen.

FIG. 6 illustrates an example of an impression, while FIG. 7 illustrates an example of a click interaction, on a mobile device 600 with a touch-sensitive screen. In these examples, the mobile device's reader application presents articles and webpages that are available online. Also, in these examples, the reader application has a "For You" page that provides summaries of a subset of articles/webpages for a user that it selects from a larger set of documents that it receives from a server set for various user subscribed document feeds. The example illustrated in FIG. 6 is shown in three operational stages 602, 604, and 606 of the reader application's user interface.

Each of these stages shows a summary page that displays a number of summary panes 620 for a number of articles and/or webpages. The first stage 602 shows the summary page, in response to user touch input, scrolling across the display screen of the mobile device (e.g., smartphone or tablet) on which the reader application executes. The second stage 604 then shows the summary page right after the scrolling has stopped. At this stage, the interaction detector sets a first timer (Timer1).

The third stage 606 next shows the summary page after it has remained stationary on the display screen for longer than the duration of the first time period (t1), at which time the interaction detector 110 of the reader records an impression interaction for each associated attribute of the document summary 620f and the document summary 620g that came into full display on the display screen during this duration. The set of attributes associated with the document summary 620f or 620g is the set of attributes associated with this summary's associated document in some embodiments. In some embodiments, the interaction detector 110 starts the timer for a document summary pane even when the summary pane is partially displayed on the display screen by at least a configured percentage of the pane.

The embodiment illustrated in FIG. 6 requires the summary page to remain stationary before the interaction detector 110 starts a timer to measure the expiration of the first time period. In other embodiments, the interaction detector 110 detects impressions for document summaries even while the summary page is being scrolled. In these embodiments, the interaction detector 110 starts the timer for a document summary when the summary is displayed (partially in some embodiments or completely in other embodiments) on the display screen.

The example illustrated in FIG. 7 is shown in three operational stages 702, 704, and 706 of the reader application's user interface. The first stage 702 shows a document summary page being displayed on the display screen of the mobile device 600 on which the reader application executes. This stage also shows the user's selection of the document summary 620f through a touch tap operation on the touch-sensitive display screen of the mobile device 600. The second stage 704 then shows that in response to this tap operation, the reader application displays the selected article on the display screen of the mobile device. At this stage, the interaction detector sets a second timer (Timer2).

The third stage 706 next shows that this article page remains displayed on the display screen for longer than a second duration of time (t2), at which time a interaction detector 110 detects a click operation for the attributes associated with the displayed article. Once the selected article is displayed by the reader application, the interaction detector 110 starts a timer to measure the duration of time during which the user views the selected article before changing the content of the display screen. During this time, the user can scroll through the article without resetting or otherwise affecting this timer. In fact, in some embodiments, the reader increases the interaction scores for the article attributes when the user scrolls through the displayed, selected article.

At 510, the process determines whether the detected interaction is a non-impression, non-click interaction that needs to be transformed into an impression score, a click score, or both. When the detected interaction is a click or impression, the process transitions to 520. On the other hand, when the detected interaction is neither a click nor an impression, the process transforms (515) the detected interaction into a click score and/or an impression score, and then transitions to 520. One example of transforming non-impression, non-click interactions to impression and click scores was described above by reference to FIG. 3.

At 520, the process selects an attribute (e.g., a topic-identifying tag) that is associated with the document or document feed for which the identified interaction is detected at 505. As mentioned above, a document or document feed in some embodiments is associated with a set of attributes that are identified by the server set that distributes the documents. Accordingly, at 520, the process 500 selects one of the attributes in the associated set of attributes for the document or document feed associated with the detected interaction.

When the selected attribute has previously specified click, impression and overall scores, the process retrieves (at 525) these prior scores from the attribute storage 125. Otherwise, the process sets (at 525) the prior impression and click scores (1) to the average impression and click scores for the viewer on the device when there are sufficient interaction samples, or (2) to system default impression and click scores when there is not a sufficient number of interaction samples on the device. In some embodiments, the average impression/click scores and/or system default impression/click scores are also stored in the attribute storage 125. Also, in some embodiments, the attribute-scoring engine updates the average impression/click scores while it is updating other impression/click scores (either periodically or with each update of an attribute's impression/click scores).

At 530, the process multiplies the prior impression and click scores (identified at 525) by decay parameters to reduce the contribution of these prior interactions. Next, at 535, the process adds the impression and click scores for the newly detected interaction to the prior impression and click scores after these scores were reduced through their multiplication with the decay parameter. In some embodiments, the decay parameter is 0.99 and the aggregation operation at 535 uses the above-described geometric series sum Equations (A) and (B).

At 540, the process then computes a new overall score for the attribute by dividing the attribute's new click score with the attribute's new impression score. Next, at 545, the process stores the new impression score, click score and overall score for the attribute in the attribute storage structure 125. The process then determines (at 550) whether the document or document feed for which the interaction was detected is associated with any other attribute that the process has not yet selected at 520. If so, the process returns to 520 to select another attribute and then repeats the operations 525-545 in order to adjust the impression, click and overall scores for this newly selected attribute. The process iterates through 520-550 until it has adjusted the impression, click and overall scores for all attributes associated with a document or document feed for which the interaction was detected. Once the process determines that it has processed all associated attributes, the process 500 ends.

Figure 8:
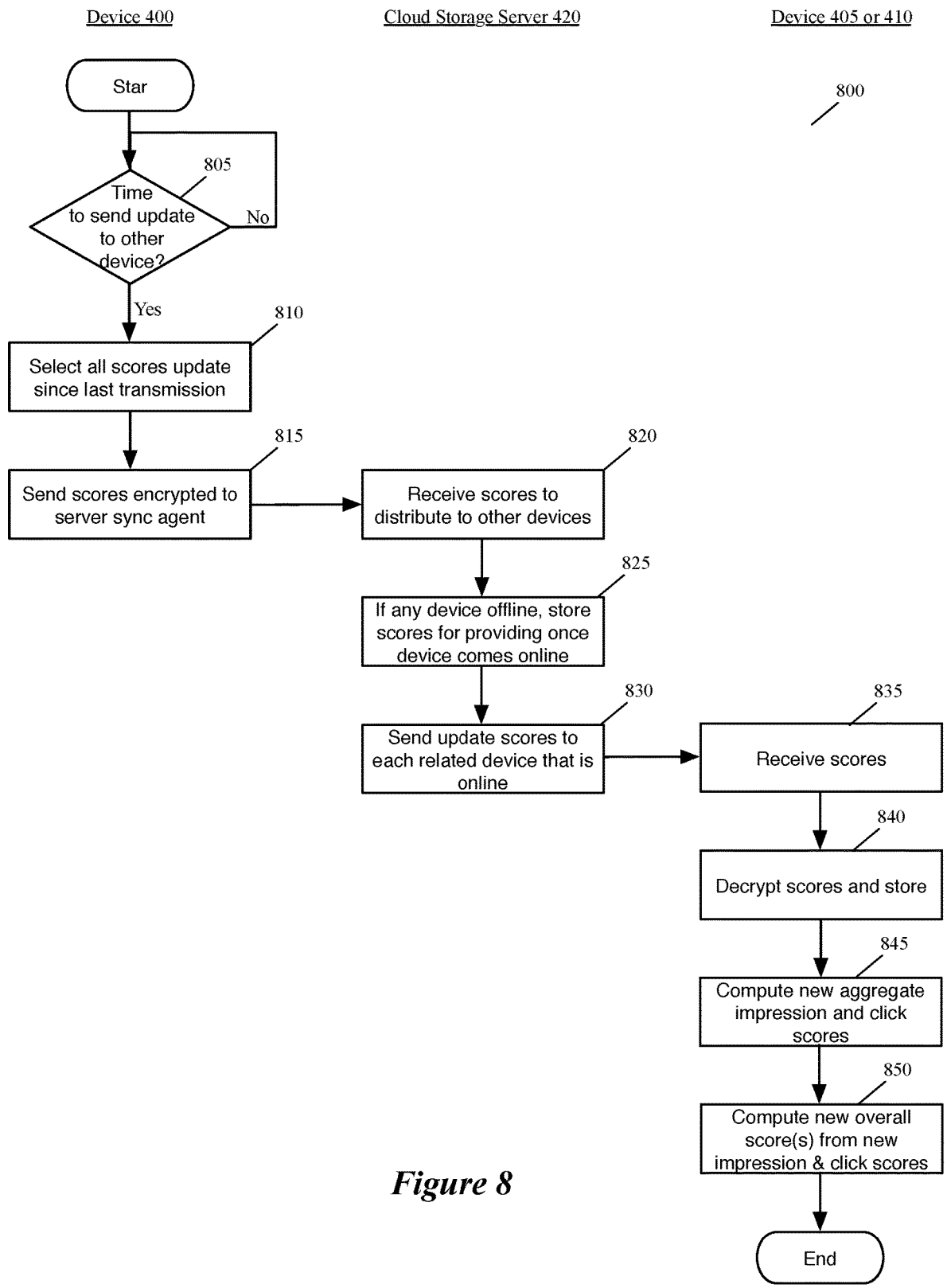
FIG. 8 illustrates a process that the devices and cloud storage server set perform when the device transmits its newly computed or updated attribute scores to the other devices through the cloud storage server set.

FIG. 8 illustrates a process 800 that the devices and cloud storage server set perform when the device 400 transmits its newly computed or updated attribute scores to the other devices 405 and 410 through the cloud storage server set 420. The device 405 or 410 in some embodiments performs a similar process on its own in some embodiments in order to transmit its newly computed or updated attribute scores to the other two devices through the cloud storage server set 420.

As shown, the synchronizing agent 425 of the reader of device 400 initially determines (at 805) whether the time has reached for it to send newly computed or updated attribute scores to the other related devices 405 and 410. As mentioned above, each of the related devices periodically sends its new or modified scores to the other related devices in some embodiments, while in other embodiments each device sends its new or modified scores to the other related devices once the device has accumulated a sufficient number of new or updated scores.

The process remains at 805 until the synchronizing agent 425 of the device 400 determines that the time has been reached for it to send newly computed or updated attribute scores to the other related devices 405 and 410. Once this time has been reached, the synchronizing agent 425 of the device 400 selects (at 810) all the impression and click scores that it has updated for interactions that its reader detected on its device 400, since the process 800 last update transmission to the other devices. These impression and click scores are the scores for multiple attributes, when the reader has detected interactions that relate to multiple attributes since the last update transmission.

After identifying (at 810) the newly computed or updated impression and click scores, the process sends (at 815) these impression and click scores to a server synchronizing agent 450 in an encrypted format that the server synchronizing agent cannot decrypt. The server agent 450 receives (at 820) these scores, and stores (at 825) these scores in the server's attribute storage 455 when one of the related devices (e.g., device 410) is offline (i.e., does not have its synchronizing agent 425 currently communicatively connected with the server's agent 450). Once the offline device is communicatively connected to the server agent 450 (i.e., has its synchronizing agent 425 communicatively connected with the server agent 450), the server agent 450 will relay the stored impression and click scores to this device. If the device is offline for an extended period, the server agent 450 will store multiple sets of updated impression and click scores to forward to this device.

At 830, the server agent 450 sends the received impression and click scores to the related device or devices (e.g., device 405) that are currently connected to the server agent 450. In some embodiments, the server agent 450 sends the received impression and click scores to the client synchronizing agent 425 of the online related device (e.g., device 405), which receives (at 835) these scores, decrypts (at 840) these scores, and stores (at 840) these scores in the online device's attribute data storage 125. In some embodiments, the attribute-scoring engine 115 of the related device re-encrypts the received scores before storing these scores in its attribute data storage.

At 845, the related device's scoring engine 115 aggregates the received impression and click scores with the corresponding impression and click scores that it has previously computed. In some embodiments, this scoring engine uses the above described Equations (C) and (D) to aggregate the received impression and click scores with the corresponding impression and click scores that it previously computed.

Also, as mentioned above, the scoring engine in some embodiments aggregates the impression and click scores right after it stores the newly received impression and click scores. In other embodiments, the scoring engine aggregates the impression and click scores with other impression and click scores when it is generating an overall score for an attribute (e.g., during a document scoring process that computes a score for a candidate document for display). In these embodiments, the scoring engine aggregates the received impression and click scores with other impression and click scores that it previously received from the device 400. The scoring engine retrieves these other impression and click scores for the device 400 from the attribute storage 125, and increments these retrieved impression and click scores by first multiplying them with a decay parameter and then adding them with the newly received impression and click scores (e.g., per the geometric series formulation of Equations (A) and (B)).

At 850, the related device's scoring engine 115 computes a new overall score for each attribute that has a new impression score and click score as the result of the operation 845. In some embodiments, the overall score of each attribute is generated by dividing its click score by its impression score, as described above. After 850, the process 800 ends.

As mentioned above, the reader application of some embodiments uses the computed attribute scores to select subsequent documents for display and/or to arrange the display of subsequent documents that it presents. In some embodiments, the reader generates a customized score for each candidate document by using the previously computed attribute scores for the attributes associated with the candidate documents. In some embodiments, the attribute scores computed by the reader application are based on previous interactions with documents previously displayed by the reader application.

In some embodiments, the reader generates the customized scores not only based on the attribute scores that it computes based on interactions with previous documents that it presented, but also based on prior interactions with previous documents that one or more reader applications on one or more other related devices presented. The reader in some embodiments selects a subset of the candidate documents for display based on the generated customized scores. In these or other embodiments, the reader generates a layout of the summaries of the documents based on the generated customized scores.

In some embodiments, the reader generates the customized score for a document by reducing the score for each of the document's attributes by a default attribute score, and then aggregating the reduced attribute scores to generate the customized score. In some embodiments, the default attribute score is computed based on a default level of interaction with any document presented by the reader. In some embodiments, the reader aggregates the reduced attribute scores for a document by multiplying each reduced attribute score by a confidence weight value that expresses a quality of the interaction sample size. Given that one document can have more associated attributes than another document, the reader in some embodiments democratizes the aggregation of the reduced attribute scores by reducing the contribution of a subset of attribute scores in an attribute score set when the attribute score set has too many scores for too many attributes.

In some embodiments, the reader-generated score for a document also accounts for a global score for the document that the reader receives from the server set that provides the document, and based on the number of document feeds that are associated with the document. Also, in some embodiments, the document score is reduced based on an age-based decay in order to bias the document selection and presentation towards newer documents. Some embodiments also employ diversification operations to ensure the selected documents cover a diverse set of topics and to ensure that the documents from the same publisher are not clustered in the eventual presentation of the documents.

Figure 9:
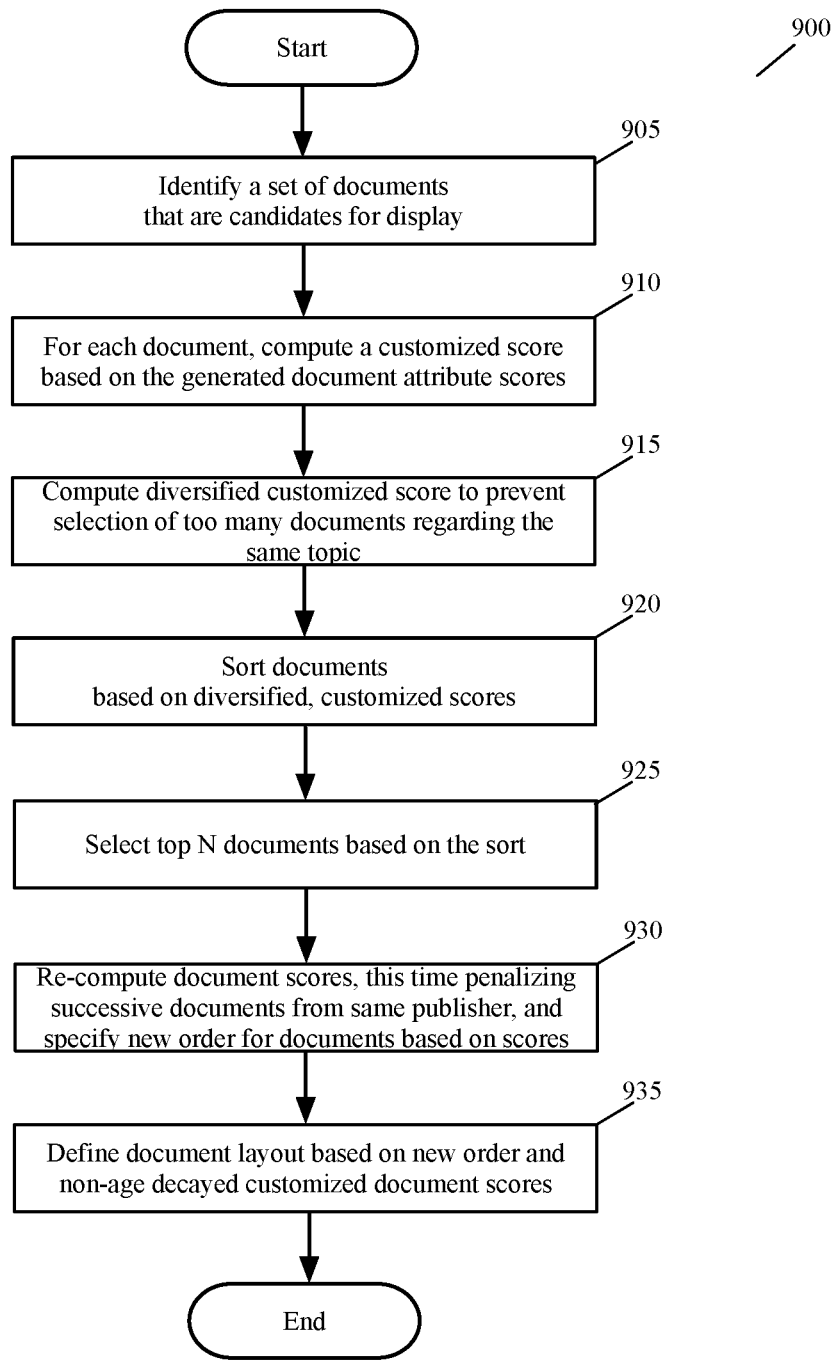
FIG. 9 conceptually illustrates a process that the reader application of some embodiments performs (1) to generate user personalized scores for a large number of candidate documents that are provided by the sever set, (2) to select a smaller subset of the candidate documents for display based on the generated personalized scores, and (3) to generate the layout for a document summary page that displays summaries of the selected subset of documents based on the generated personalized scores.

FIG. 9 conceptually illustrates a process 900 that the reader application of some embodiments performs (1) to generate user personalized scores for a large number of candidate documents that are provided by the sever set, (2) to select a smaller subset of the candidate documents for display based on the generated personalized scores, and (3) to generate the layout for a document summary page that displays summaries of the selected subset of documents based on the generated personalized scores. The reader performs this process 900 each time it identifies a set of candidate documents that are provided by the server set. In some embodiments, the server set identifies the candidate documents for the reader after the reader sends the server set a request for a new set of documents for display.

The process 900 selects a subset of the candidate documents for display based on document scores that are determined by the user's viewing preferences, which are defined by the previously computed document attribute scores. Because this selection process custom selects the subset of documents for display based on the user's viewing preferences, the server set in some embodiments can send a large set of candidate documents to the reader for display. The reader generates document scores based on the user's viewing preferences and then uses these scores to filter out the documents that the user might not find as interesting.

As shown, the process 900 identifies (at 905) a set of documents from the server set that are candidates for display by the reader. In some embodiments, the server set identifies some or all of the candidate documents based on the document feeds for which the reader is configured (e.g., automatically or based on user selection). In some embodiments, the process receives (at 905) the candidate documents in order to identify these documents.

In other embodiments, the process identifies (at 905) the candidate documents from the server without receiving these documents in order to conserve network resources that would be uselessly consumed in receiving documents that the reader may never present or summarize for presentation. In these embodiments, the process identifies (at 905) the candidate documents by receiving metadata about these documents from the server set. The received metadata for a document includes a number of document attributes (e.g., topic tags, feed tags, etc.) in some embodiments. The received metadata for a document also includes in some embodiments one or more components of the document, such as its headline, its headline photo, excerpts and/or RSS feed content. The received metadata in some embodiments also includes a server generated global score for the document.

In some embodiments, the reader performs the process 900 numerous times. Each time that the reader performs this process, it asks the server set to identify the candidate documents that are new since the last time that the reader performed the process 900 and identified the last batch of candidate documents. In some embodiments, the reader performs this operation periodically. In these or other embodiments, the reader performs this operation when it is opened and/or brought into the foreground of the display screen (i.e., it is brought to display on the screen after previously being opened and relegated to operate in the background). In some embodiments, each time the process asks (at 905) the server set to identify a set of candidate documents, the server set identifies all new documents associated with all feeds for which the reader is configured, where a new document is one that the server set has not previously identified for the reader.

Next, at 910, the process computes a customized document score for each identified candidate document. The customized document scores are based on user viewing preferences as defined by the previously computed attribute score. Hence, at 910, the process computes the customized document score for each candidate document based on the scores of the attributes associated with the document. In some embodiments, the process receives each candidate document's associated attribute when it identifies the document at 905.

In some embodiments, the reader-generated customized score for a document is based on: (1) a set of document attribute scores for the set of attributes associated with the document, (2) a global score for the document from the server set, (3) the number of document feeds that are associated with the document. In some embodiments, the document's associated set of feeds is identified by a set of feed tags that are associated with the document. The process 900 in some embodiments reduces each document's customized score by an age-based decay in order to bias the document selection and presentation towards newer documents. The computation of customized document scores will be further described below by reference to FIG. 10.

After computing the customized document scores (at 910), the process 900 performs (at 915) a diversification operation that ensures that the selected documents cover a diverse set of topics. In some embodiments, the process diversifies the documents across the documents' associated document feeds (e.g., the topic feeds). As mentioned above, the reader application allows the user to subscribe to several document feeds, with each feed associated with one content provider (e.g., one newspaper, one magazine, one television channel, one media conglomerate, etc.) or with one topic (e.g., sports, NFL, business, politics, a particular company, etc.). The server set can associate a document with one or more feeds.

The process performs the diversification operation by computing a diversified customized score for each document. In some embodiment, the process computes a document's diversified customized score by adjusting (e.g., multiplying or subtracting) the document's customized score (computed at 910) by a diversification penalty. To compute this penalty, the process in some embodiments divides the candidate document pool into groups associated with their document feeds (e.g., associated with their topic feeds). When one document is associated with multiple feeds (e.g., multiple topic feeds), the process in some embodiments selects just one of the feeds (e.g., one of the topic feeds) for the document.

After grouping the documents based on their feeds, the process sorts the documents according to their customized scores, which were computed at 910. The process then computes the diversification penalty for the document from its rank in its document-feed group's sort, and then uses this diversification penalty to compute a diversified, customized score for the document. This approach ensures that successive documents that are part of the same feed are penalized in order to spread the range of document scores. One manner for computing this penalty and computing the diversified, customized score will be further described below.

At 920, the process then identifies an order for the received documents based on the diversified customized document scores computed at 915. In some embodiments, the order sorts the documents from the highest scoring document to the lowest scoring document (i.e., with the highest diversified customized document score at the top of the order and the lowest diversified customized document score at the bottom of the order). The process then selects (at 925) the top N documents based on the order identified at 920, where N is an integer.

The reader in some embodiments is configured to display a certain percentage (e.g., 10 percent) of the candidate documents identified at 905. In these embodiments, the number N can vary based on the size of the candidate document set. In other embodiments, the number N is derived based on a customized personal flow rate that is computed for a user of the reader application. The personal flow rate in some embodiments is dependent on the number of candidate documents (which is dependent on the duration of time since the last time that the server set identified candidate documents for the reader) and the number of documents that the user would like to typically review.

After selecting the top N documents, the process 900 performs (at 930) a publisher diversification operation to try to prevent one or more clusters of documents (i.e., adjacent set of documents) from the same publisher in the eventual presentation of the documents. The process 900 in some embodiments performs the publisher diversification operation by computing a publisher diversified customized score for each document. In some embodiments, the process computes a document's publisher diversified customized score by adjusting (e.g., multiplying or subtracting) the document's customized score (computed at 910) by a publisher diversification penalty.

To compute this penalty, the process in some embodiments divides the candidate document pool into groups associated with their publisher feeds. In some embodiments, the process sorts the documents in each publisher group according to their customized scores, which were computed at 910. After sorting the documents in each publisher group, the process then computes the publisher diversification penalty for the document from its rank in its publisher-feed group's sort, and then uses this publisher diversification penalty to compute a publisher diversified, customized score for the document. This approach ensures that successive documents that are part of the same publisher feed are penalized in order to spread the range of document scores for each publisher.

Based on the publisher diversified, customized scores, the process 900 defines (at 930) a new order for the selected N documents. Specifically, the process arranges the selected N documents in an order that has the document with the largest publisher, diversified customized score at the top of the order and the document with the lowest publisher, diversified customized document score at the bottom of the order.

After 930, the process 900 generates (at 935) a document summary page for the selected N documents based on the order of these documents after the publisher diversification operation (i.e., based on the order identified at 930). One example of a document summary page was described above by reference to FIG. 6. As shown FIG. 6, the reader in some embodiments generates a document summary page that includes different sized summary panes and different types of summary panes for different documents. Two summary panes can differ in terms of the type of content that they display, e.g., one can include an image, a headline and an excerpt, another can include just a headline and excerpt, while another can include an image and headline.

The bigger the summary pane and the richer the content of the summary pane, the more likely that the user will notice the summary pane. Hence, in some embodiments, the process uses the document score to determine the size of the document summary pane and/or the type of data included in the document summary panes. Specifically, in these embodiments, the computed customized document scores are used as one type of metric that the reader's summary-page layout generator employs to select the sizes and types of summary panes for the documents. In some embodiments, the summary-page layout generator uses the customized scores that are not time decayed, nor are penalized based on their feed or publisher. For instance, in some embodiments, the customized scores that the layout generator uses to identify the documents with the bigger summary panes depend on the document attribute scores, the document global scores and the number of feeds associated with the document.

In some embodiments, the reader is configured to select one document out of every M documents on the diversified, selected document list to have a big summary pane, while the other documents have a smaller summary pane. The variable M in some embodiments is configured based on the size and orientation of the display screen of the device on which the reader executes. Under this approach, the reader selects the one document in each set of M documents based on the computed customized document scores. This customized score for each document in some embodiments includes the document's personalization score (derived from the document attribute scores), global score and feed score, while this score in other embodiments is just based on the document's personalization score.

In order to generate and display the document summary page (at 935), the process 900 retrieves from the server set the documents that it identifies for the summary page. In some embodiments, the process retrieves these documents after it has identified (at 925) the documents for the summary page. In other embodiments, the process generates the document summary page based on the document metadata that it receives (at 905). Hence, in these embodiments, the process does not need to retrieve documents at 935. In these embodiments, the process retrieves the documents only after the document's summary pane has been selected on the document summary page.

After 935, the process ends. One of ordinary skill will realize that the reader application of other embodiments can use other processes to select a subset of the candidate documents for display based on the generated personalized scores, and to generate the layout of the document summary page based on these scores. For example, the selection process of other embodiments performs the topic diversification operation after selecting the documents based on the customized scores, instead of performing this operation at 915 before selecting the documents at 920.

Figure 10:
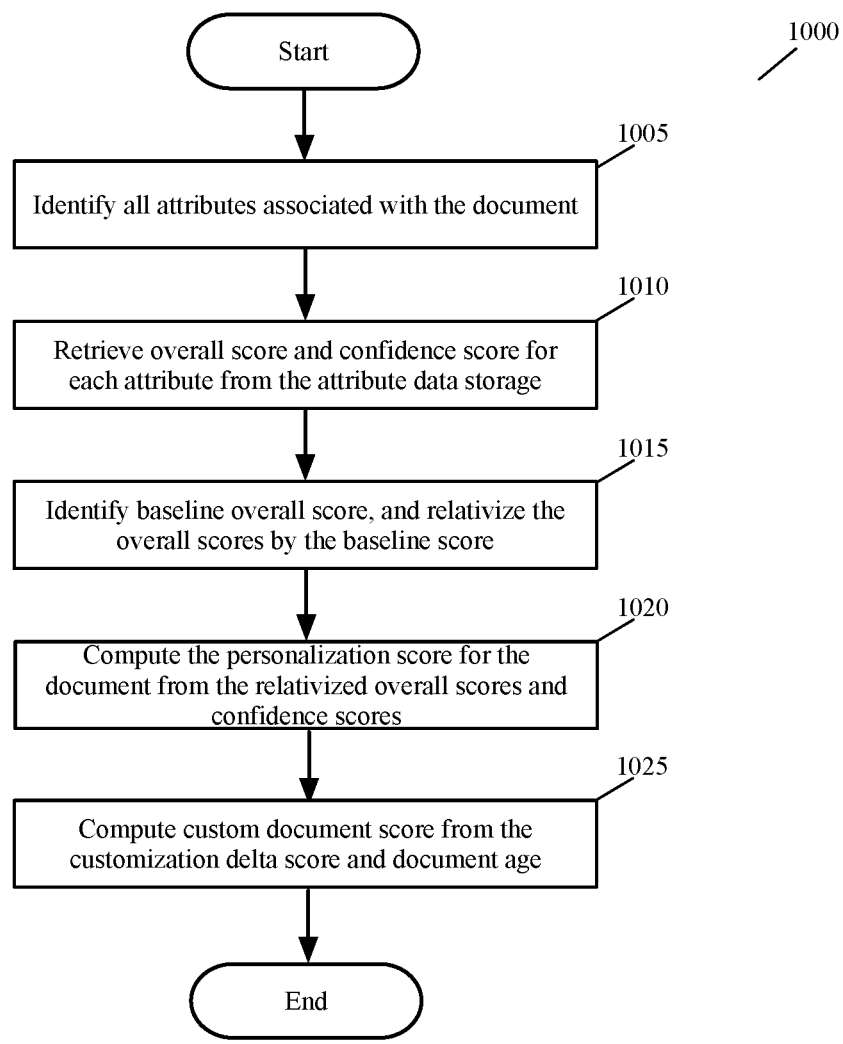
FIG. 10 conceptually illustrates a process that a document-scoring engine of a reader application of some embodiments performs to generate a score for a received document.

FIG. 10 conceptually illustrates a process 1000 that a document-scoring engine of a reader application of some embodiments performs to generate a score for a received document. The document-scoring engine performs this process 1000 each time it is called by the process 900 at 910 to compute a cost for a received document. As shown, the process 1000 initially identifies (at 1005) all attributes associated with the document. In some embodiments, the reader receives the set of attributes associated with a document from the server set that provides the document. In some of these embodiments, the server set sends the document's attribute set with the document or the document metadata that it provides. The document's global score and associated feeds are part of the received document metadata in some embodiments.

Next, at 1010, the process retrieves the overall score and the confidence score that the reader's attribute scoring engine 115 has computed for each attribute from the attribute storage 125. As mentioned above, the confidence score of an attribute in some embodiments is derived from that attribute's impression score (e.g., is equal to the attribute's impression score). Also, as mentioned above, an attribute's overall score in some embodiments equals the attribute's click score divided by the attribute's impression score. In some embodiments, the attribute's click and impression scores are composite scores that combine click and impressions counts generated on the reader's device respectively with click and impression counts generated on one or more devices related to the reader's device.

Instead of retrieving the overall score for each identified attribute, the process 1000 in some embodiments retrieves (at 1010) impression and click scores for each identified attribute. In these embodiments, the process 1000 computes (at 1010) the overall score for each attribute based on the retrieved impression and click scores. In some embodiments, the retrieved impression and click scores for one attribute are multiple pairs of impression/click scores for multiple related devices and/or device orientations, and the process 1000 generates the overall score for that attribute by aggregating these pairs of scores (e.g., by using Equations (C) and (D)) and then dividing the aggregate click score by the aggregate impression score.

After identifying the overall and confidence scores for each identified attribute, the process 1000 identifies (at 1015) a baseline overall score, and then relativizes (at 1015) each retrieved overall score with the baseline score. In some embodiments, the baseline score is the average click through rate for the user of the device. When the reader has presented a sufficient number of document summaries to the user, the average click through rate in some embodiments equals the number of clicks that the reader has counted to date divided by the number of impressions that the reader has counted to date. In some embodiments, the click and impression counts also account for the click and impression counts for the user on other related devices. When the reader has not presented a sufficient number of document summaries to the user, the average click through rate in some embodiments can be set to the average click through rate on a related device (if the related device has presented a sufficient number of document summaries) or a configured system-wide average click through rate.

The process 1000 subtracts the baseline overall score from each identified attribute's overall score in order to normalize the attribute's overall score to the type of user. Some users are heavy clickers (e.g., they click on a large number of document summaries), while other users are light clickers (e.g., they click on a small number of document summaries). Only by removing the baseline overall score from an attribute's computed overall score can the document scoring engine ascertain whether the viewer finds a particular document attribute more or less interesting than the average document attribute. The discussion below refers to the result of subtracting the baseline overall score from each identified attribute's overall score as that attribute's relativized delta overall score or relativized delta score.

After generating (at 1015) the relativized delta scores for the identified attributes, the process 1000 computes a personalization score for the document from the delta scores and confidence scores of the identified attributes. In some embodiments, the process uses the confidence scores as weight parameters for combining the delta scores. The following example is illustrative of how the document-scoring engine computes the relativized delta scores and then uses these scores to compute the personalization score for a document.

In this example, an article is published by Sports Channel Partners (SCP) and is tagged with two attributes, NFL and Business. Also, in this example, the SCP publisher tag has 20 clicks and 80 impressions (for a click through rate of 0.25), the NFL tag has 8 click and 40 impressions (for a click through rate of 0.2), the Business tag has 3 clicks and 60 impressions (for a click through rate of 0.05), and the overall baseline estimate has 9 clicks and 90 impressions (for a click through rate of 0.1).

Once the baseline score is removed from the overall scores of the three attributes, SCP, NFL, and Business, the relativized delta scores for these three attributes are respectively 0.15 (for the SCP), 0.1 (for NFL), and −0.5 (for Business). The document-scoring engine then computes the personalization score for the article as:

Personalization_Score=0.15*0.8+0.1*0.4+(−0.5)*0.6=+0.11

In this equation, the relativized delta scores of the three attributes, SCP, NFL, and Business, are weighted by their confidence scores, which are the impression counts after these counts have been normalized to fall within the 0 to 1 range (i.e., after the impression counts have been divided by 100, e.g., for the case when the Equation (A) is used to express the impression score).

Given that different documents can be associated with a different number of attributes (e.g., some are associated with many attributes while others are associated with a few), the personalization scores of documents with many attributes might become much larger than documents with fewer attributes. Hence, in order to prevent this from undesirably skewing the selection results towards documents with many associated attributes, the process 1000 performs a democratization operation at 1020 that reduces the contribution of a subset of attribute scores in an attribute score set when the attribute score set has too many scores for too many related attributes.

To avoid bias due to correlated tags (NFL football, football, college football, NFL playoffs, NFL quarterbacks, etc.), the democratization operation of some embodiments saturates the cumulative effect of tag estimates. As mentioned above, some embodiments compute the document's personalization score as the raw weighted sum of the relativized delta scores and their associated confidence rating as follows:

rawRelativeDocEstimate=$R1*P1+R2*P2+ \ldots +Rn*Pn$, where the Rs are relativized delta scores, the Ps are the confidence rating, and n is the number of attributes. Instead of computing this score, the document-scoring engine computes the document's personalization score as:

relativeDocEstimate=rawRelativeDocEstimate/$n^{DM}$, where n again is the number of attributes, and DM is a configurable parameter between 0 and 1 that quantifies the degree of democratization (or saturation). When DM equals 0, it means no democratization, while DM equal to 1 means severe democratization (muting the cumulative effect of having multiple feature estimates on the same document). In some embodiments, the DM equals 0.25 or 0.3.

After computing the personalization score for the document, the process computes (at 1025) the final score for the document, and then ends. In some embodiments, the final score is based on the personalization score, a global document score, and a score generated by the number of subscription feeds to which the document is associated. For instance, in some embodiments, the final document score can be expressed as:

Document Score=$2^{X-Y}$, (E)

where X is the customized document score and Y is an age-based decay parameter that is meant to bias the document scoring towards a newer document.

In some embodiments, the customized document score X in Equation (E) can be expressed by Equation (F) below:

X=$P$*Personalization_score+$G$*Global_Score+ $S$*Num_Subscribed, (F)

where P, G, and S are weighting parameters, Global_Score is a global document score for the document that the server set provides, and Num_Subscribed quantifies the number of user-subscribed feeds associated with the document (e.g., an article might be part of an SCP feed and an NFL feed). In some embodiments, each of the Personalization_Score, Global_Score, and Num_Subscribed scores are normalized to fall within the range of 0 to 1. Also, in some embodiments, the weighting parameters P, G, and S are selected in order to ensure that X falls within the range 0 to 1. For example, in some embodiments, the sum of these three weighting parameters P, G, and S is equal to or less than 1.

The global document score in some embodiments expresses an interest level for the document across all users of the system. Alternatively, or conjunctively, the global document score in some embodiments expresses the quality of the publisher and the quality of the document components (e.g., images, headline, etc.). The document-scoring engine in some embodiments performs a normalization operation to spread the global document scores of the documents across the full range of values from 0 to 1. This operation is done because certain types of documents (e.g., documents regarding more popular topics (Entertainment) or from large publishers) always have high global scores, while other types of documents (e.g., documents relating to more obscure topics (HiFi) or from smaller publishers) have global scores that cover the full range of values.

Thus, to ensure that the reader selects documents relating to the more obscure interests of the user, the reader application of some embodiments maintains for each feed a range of global scores for the last T (e.g., 75) documents that the reader receives for that feed. The reader then maps this range to the range from 0 to 1, or to a portion of this range (e.g., from 0.5 to 1), and then uses this mapping to adjust the global scores of each received document that is associated with the feed. In some embodiments, the reader application identifies for each feed a sorted order, in which the candidate documents in that feed are sorted by the global scores that are provided by the server set. For instance, one feed might provide three of the candidate documents, which respectively have global scores of 1, 0.99 and 0.98. The reader in some embodiments then reduces the global score for one or more of the documents in each feed that has more than one document. For the above example, the reader in some embodiments modifies the global scores of the three documents from 1, 0.99 and 0.98 to 1, 0.66, and 0.33.

The reader application of some embodiments also saturates how it increments the Num_Subscribed score of each document when the document is associated with several feeds. As mentioned above, the Num_Subscribed score quantifies the number of user-subscribed feeds associated with the document (e.g., an article might be part of an SCP feed and an NFL feed). Clearly, this score should be higher for a document that is associated with three feeds than for a document that is associated with two feeds. However, this score should not be that much higher for a document that is associated with ten feeds than for a document that is associated with nine feeds, because once a document is associated with a certain number of feeds it is pretty clear that the document should be of interest to the user and any additional feed association does not convey any additional information. Hence, in some embodiments, the reader application increments the Num_Subscribed score for a document based on a cost function that asymptotically levels out.

In the document scoring equation (E), the age decay parameter Y in some embodiments can be expressed as by Equation (G) below:

$$Y=\text{Age/Half\_Life}, \quad (G)$$

where Age is the age of the document, and Half_Life is a system configured parameter. In some embodiments, the Half_Life parameter can be different for documents from different feeds, and it can be expressed in hours (e.g., 6 hours). In the document scoring equation above, the score of the document is an exponential value that is based on the level of the viewer's interest and the freshness of the document. In this equation, Y provides an age-based exponential decay for the score of the document.

In some embodiments, the reader application uses the Equations (E)-(G) not only for the document selection filtering operation, but also for the document summary layout generation operation. In some of these embodiments, the document selection filtering operation and the document layout generation operation use the following Equation (H), which is a modified version of Equation (G):

$$Y=\text{Age}/(P*\text{Half\_Life}), \quad (H)$$

where P is a time-decay softening parameter. By increasing the value of parameter P, the reader operation reduces the score penalty that it assesses a document for its age. In other words, when parameter P is large, the document score is less reduced due to the age of the document.

In some embodiments, the document selection filtering operation uses a larger parameter P value, while the document summary layout generation operation uses a smaller parameter P value. The document selection filtering operation computes each candidate document's score by using this larger P parameter value, and then selects the top N scoring documents based on these computed scores. The document summary layout generation operation uses its smaller P parameter value to re-compute the scores of the selected N scoring documents, uses these recomputed scores to re-order the selected N documents, and then presents the document summaries based on their new order.

For instance, in some embodiments, the document selection filtering operation uses a parameter P that is between 1 and 5, while the document layout generation operation uses a parameter P that is equal to 1. These different decay-softening parameters P have the effect of (1) ensuring that the top N documents that the reader selects from the pool of candidate documents (e.g., identified at 905) are not as heavily biased towards more recent documents (e.g., more recent articles), while also (2) ensuring that the presentation of the N documents orders the documents in an order that is more heavily biased towards more recent documents (i.e., it is more likely that the more recent documents appear first in the presentation). In other embodiments, the document summary layout generation operation does not use the age decay parameter Y to identify the order for displaying the document summaries, or to identify the size of the summary panes for the documents.

As mentioned above, the reader of some embodiments performs a topic diversification operation (e.g., at 915) in order to ensure that multiple successive document summaries are not associated with the same topic. To perform this operation, the process in some embodiments divides the candidate document pool into groups associated with their document feeds (e.g., associated with their topic feeds). When one document is associated with multiple feeds (e.g., multiple topic feeds), the process in some embodiments selects just one of the feeds (e.g., one of the topic feeds) for the document. In some embodiments, each document is associated with a main topic feed, and the reader selects this topic feed to perform the topic diversification operation.

After grouping the documents based on their feeds, the process sorts the documents in each topic group according to their customized scores (e.g., the score computed at 910 based on Equation (E)), or according to another score (e.g., their global scores). The process then computes the diversification penalty for the document from its rank in its document-feed group's sort, and then uses this diversification penalty to compute a diversified, customized score for the document. This approach penalizes successive documents that are part of the same feed in order to spread the range of document scores.

For instance, after identifying multiple orders for multiple topic feeds, the reader in some embodiments computes the diversification penalty DP for each document based on Equation (I) below:

$$DP=(1-D)^O, \quad (I)$$

where D is a configured diversification parameter between 0 and 1, and O is the rank of the document in its respective feed's order, which is sorted based on the document global scores in some embodiments. When D equals zero, no diversification is applied. As D reaches 1, the diversification operation ensures round robin selection of the documents from the different feeds (i.e., pick one article for each feed, then a second for each feed, then a third for each feed, etc.). In this approach, each round is sorted by the original raw score as a "tiebreak" within the round. In some embodiments, the reader computes the diversified, customized document score for a document by multiplying the customized document score (e.g., computed based on Equation (E)) of the document with the diversification penalty (e.g., the penalty computed according to Equation (I)) that is computed for the document.

In some embodiments, the reader performs (at 915) the diversification operation before selecting (at 925) the top N documents for display. In other embodiments, the reader performs the diversification operation after selecting the top N documents, in order to just re-arrange the document summaries in the document summary layout based on the diversified, recomputed scores.

Figure 11:
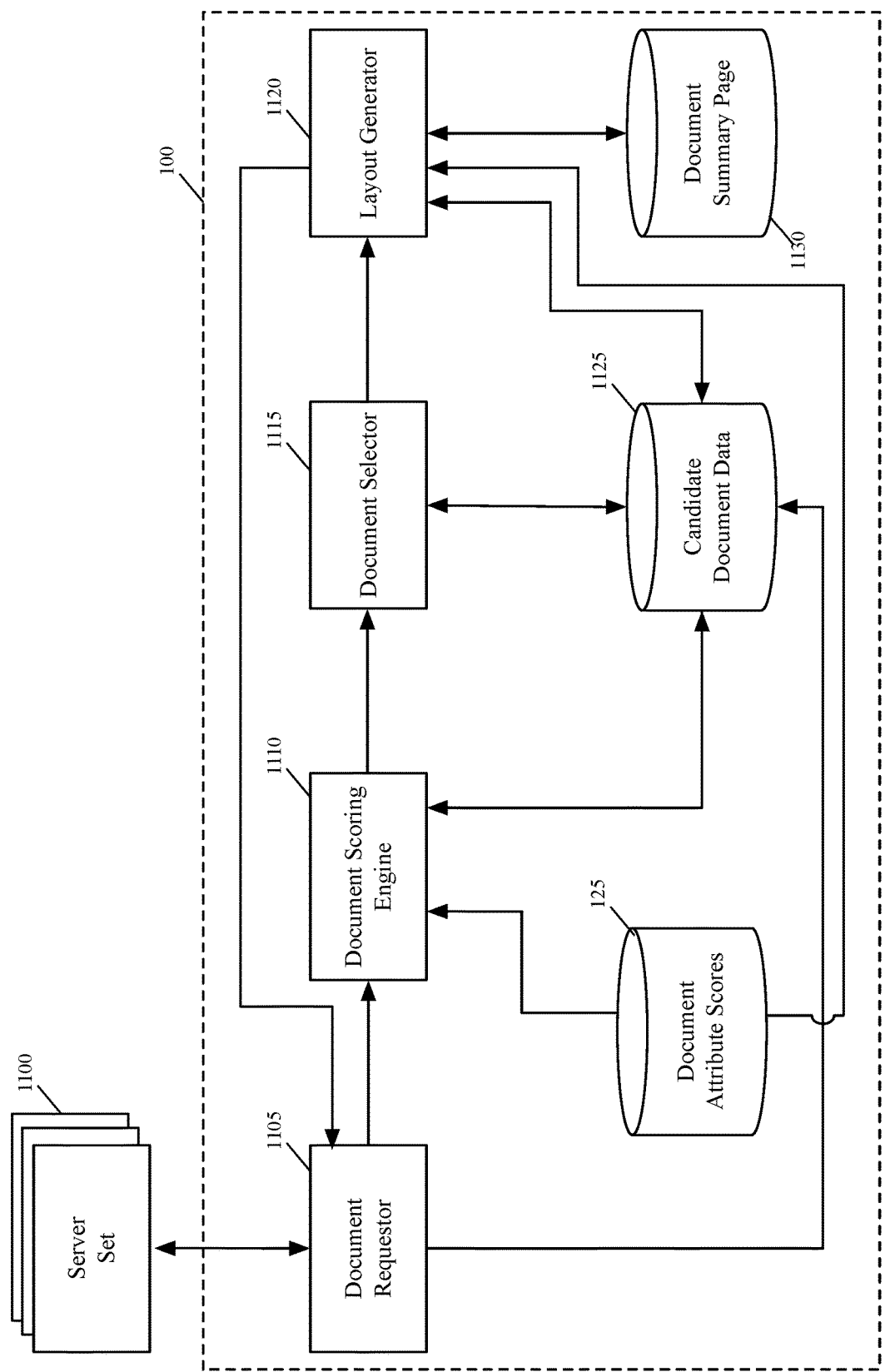
FIG. 11 illustrates several additional modules of the document reader of some embodiments.

FIG. 11 illustrates several additional modules of the document reader 100 of some embodiments. These modules interface with the server set to identify candidate documents for display, score the candidate documents based on the viewing preferences of the user(s), select a subset of the candidates documents for display, and generate a layout of a document summary page that provides summaries of the documents. As shown, these modules include a document requestor 1105, a document-scoring engine 1110, a document selector 1115, and a layout generator 1120.

The document requestor 1105 interfaces with the server set 1100 to identify a set of candidate documents for display. Each time that the document requestor 1105 asks for a new set of candidate documents, it asks the server set to identify the candidate documents that are new since the last time that it asked for candidate documents. In some embodiments, the document requestor performs this operation periodically. In these or other embodiments, the requestor performs this operation when the reader is opened, when the reader is brought into the foreground of the display screen, or upon user request. In some embodiments, each time the document requestor asks the server set to identify a set of candidate documents, the server set identifies all new documents associated with all feeds for which the reader is configured, where a new document is one that the server set has not previously identified for the reader.

The document requestor 1105 stores the identified candidate document data that it receives from the server set 1100 in the candidate document data storage 1125. In some embodiments, this data storage stores each of the identified candidate documents. In other embodiments, this data storage only stores metadata regarding some or all of the candidate documents, because the other reader modules (e.g., layout generator 1120 and UI module (not shown)) obtain a document in its entirety whenever needed from the document requestor 1105.

After storing the identified candidate document data, the document requestor 1105 directs the document-scoring engine 1110 to compute a score for each document. The document-scoring engine 1110 performs the process 1000 of FIG. 10 for each document in order to compute a score for the document. As described above, this process uses the previously computed scores (e.g., impression, click and confidence scores in the attribute storage 125) of a document's associated attributes, in order to compute the document's score. The document-scoring engine 1110 stores each document's score in the document data store 1125. In some embodiments, the document-scoring engine 1110 computes both the customized document score (e.g., according to Equation (E)), and the diversified, customized document score (e.g., according to Equation (I)).

Once the document scoring engine has computed scores for the candidate documents and stored this data in the document data storage 1125, the document selector 1115 identifies an order for the candidate documents based on their computed scores (e.g., their computed diversified, customized scores), and stores this order in the document data store 1125. The document selector 1115 also selects the top N document based on the sorted order as the candidate documents for display on the document summary page. The document selector 1115 stores the identity of the selected N documents in the document data storage 1125. The document selector 1115 then directs the summary page layout generator 1120 to generate the summary page layout.

The layout generator 1120 identifies the N documents for the summary layout page from the data that the selector 1115 stored in the document data storage 1125 that identities these N documents. The layout generator then uses the attribute scores (i.e., the scores of the attributes associated with the N documents) stored in the attribute storage 125 to generate the summary page layout per one of the approaches described above. As described above, the layout generator 1120 might compute new scores for the N documents b using different scoring functions or the same scoring function with different parameter values than the scoring functions used by the document scoring engine 1110.

To generate the layout, the layout generator might need the entirety of the document, which in some embodiments might not have been initially obtained by the document requestor. In such situations, the layout generator 1120 obtains the needed document from the document requestor, which, in turn, obtains it from the server set 1100. In other embodiments, the layout generator does not need the document in order to generate a summary pane for the document. Instead, in these embodiments, the layout generator generates the document's summary pane from the metadata that it receives for the document. The layout generator stores the summary page layout in a summary page storage 1130. The reader's UI interface 105 (not shown in FIG. 11) retrieves the summary page from the storage 1130 and presents this page on the display screen of the mobile device.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
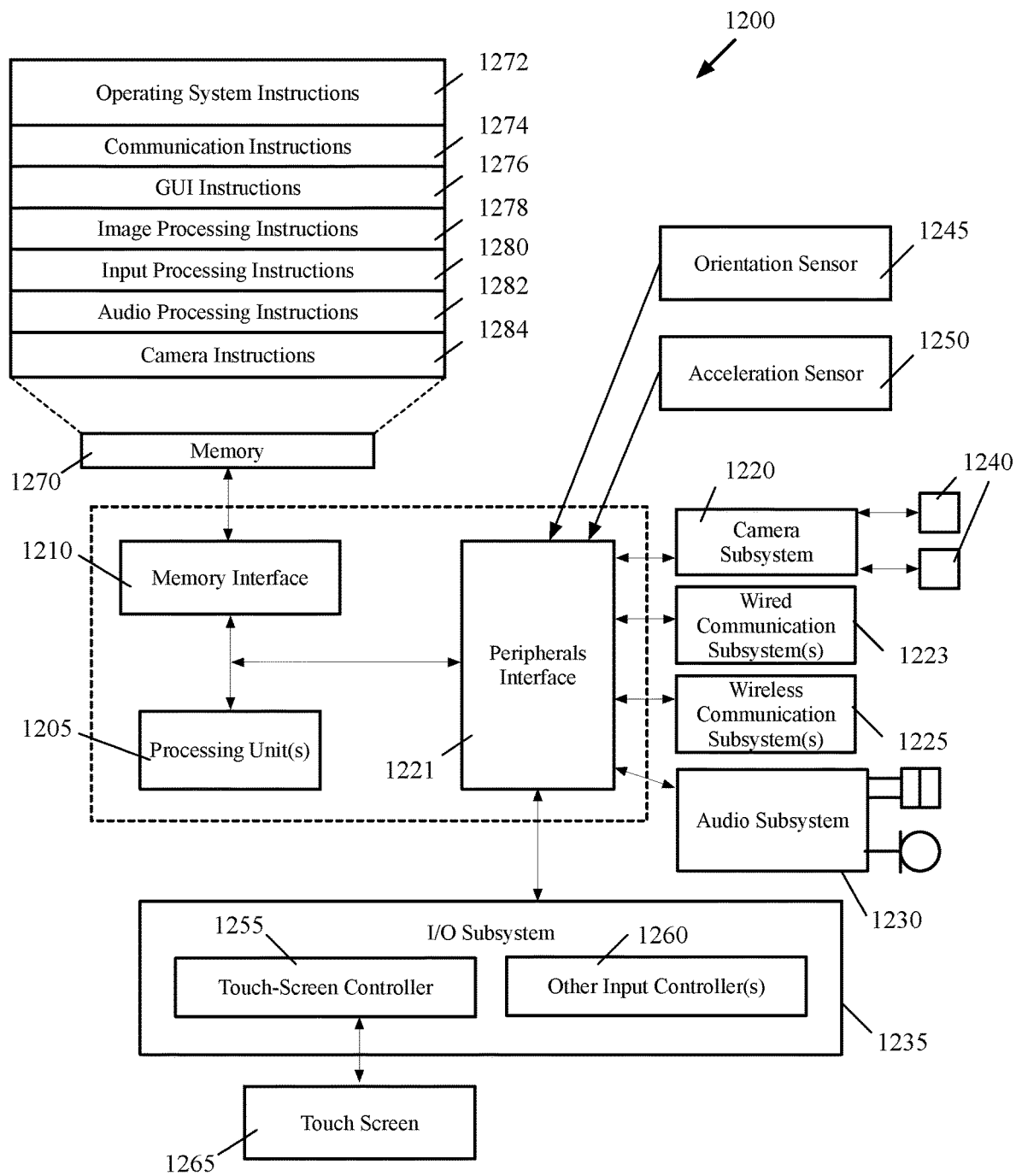
FIG. 12 is an example of an architecture of such a mobile computing device.

The applications of some embodiments operate on mobile devices, such as smart phones (e.g., iPhones®) and tablets (e.g., iPads®). FIG. 12 is an example of an architecture 1200 of such a mobile computing device. Examples of mobile computing devices include smartphones, tablets, laptops, etc. As shown, the mobile computing device 1200 includes one or more processing units 1205, a memory interface 1210 and a peripherals interface 1221.

The peripherals interface 1221 is coupled to various sensors and subsystems, including a camera subsystem 1220, a wireless communication subsystem(s) 1225, an audio subsystem 1230, an I/O subsystem 1235, etc. The peripherals interface 1221 enables communication between the processing units 1205 and various peripherals. For example, an orientation sensor 1245 (e.g., a gyroscope) and an acceleration sensor 1250 (e.g., an accelerometer) is coupled to the peripherals interface 1221 to facilitate orientation and acceleration functions.

The camera subsystem 1220 is coupled to one or more optical sensors 1240 (e.g., a charged coupled device (CCD) optical sensor, a complementary metal-oxide-semiconductor (CMOS) optical sensor, etc.). The camera subsystem 1220 coupled with the optical sensors 1240 facilitates camera functions, such as image and/or video data capturing. The wireless communication subsystem 1225 serves to facilitate communication functions. In some embodiments, the wireless communication subsystem 1225 includes radio frequency receivers and transmitters, and optical receivers and transmitters (not shown in FIG. 12). These receivers and transmitters of some embodiments are implemented to operate over one or more communication networks such as a GSM network, a Wi-Fi network, a Bluetooth network, etc. The audio subsystem 1230 is coupled to a speaker to output audio (e.g., to output voice navigation instructions). Additionally, the audio subsystem 1230 is coupled to a microphone to facilitate voice-enabled functions, such as voice recognition (e.g., for searching), digital recording, etc.

The I/O subsystem 1235 involves the transfer between input/output peripheral devices, such as a display, a touch screen, etc., and the data bus of the processing units 1205 through the peripherals interface 1221. The I/O subsystem 1235 includes a touch-screen controller 1255 and other input controllers 1260 to facilitate the transfer between input/output peripheral devices and the data bus of the processing units 1205. As shown, the touch-screen controller 1255 is coupled to a touch screen 1265. The touch-screen controller 1255 detects contact and movement on the touch screen 1265 using any of multiple touch sensitivity technologies. The other input controllers 1260 are coupled to other input/control devices, such as one or more buttons. Some embodiments include a near-touch sensitive screen and a corresponding controller that can detect near-touch interactions instead of or in addition to touch interactions.

The memory interface 1210 is coupled to memory 1270. In some embodiments, the memory 1270 includes volatile memory (e.g., high-speed random access memory), non-volatile memory (e.g., flash memory), a combination of volatile and non-volatile memory, and/or any other type of memory. As illustrated in FIG. 12, the memory 1270 stores an operating system (OS) 1272. The OS 1272 includes instructions for handling basic system services and for performing hardware dependent tasks.

The memory 1270 also includes communication instructions 1274 to facilitate communicating with one or more additional devices; graphical user interface instructions 1276 to facilitate graphic user interface processing; image processing instructions 1278 to facilitate image-related processing and functions; input processing instructions 1280 to facilitate input-related (e.g., touch input) processes and functions; audio processing instructions 1282 to facilitate audio-related processes and functions; and camera instructions 1284 to facilitate camera-related processes and functions. The instructions described above are merely exemplary and the memory 1270 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 12 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 12 may be split into two or more integrated circuits.

Figure 13:
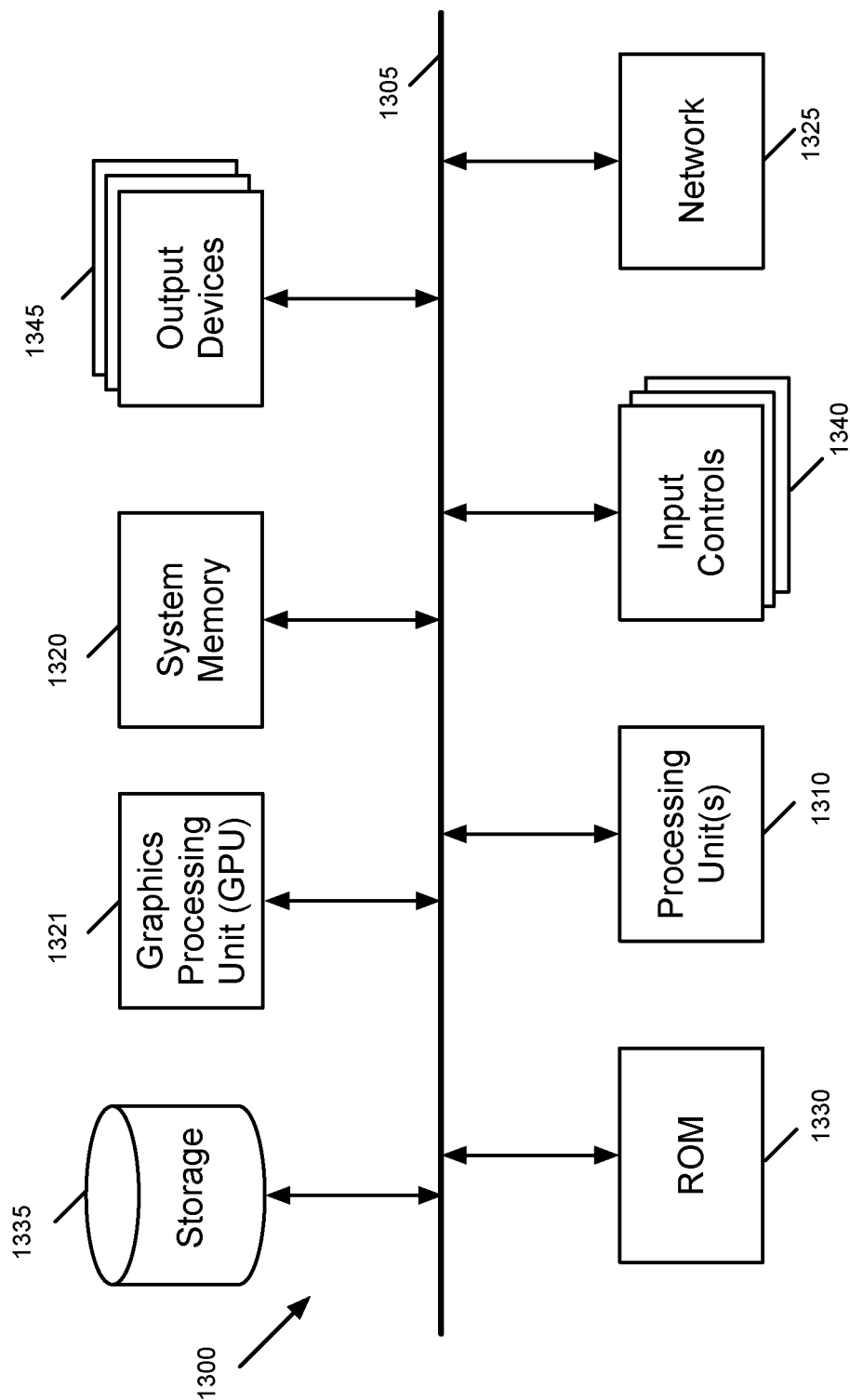
FIG. 13 conceptually illustrates another example of an electronic system with which some embodiments of the invention are implemented.

FIG. 13 conceptually illustrates another example of an electronic system 1300 with which some embodiments of the invention are implemented. The electronic system 1300 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1300 includes a bus 1305, processing unit(s) 1310, a graphics processing unit (GPU) 1321, a system memory 1320, a network 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the GPU 1321, the system memory 1320, and the permanent storage device 1335.

From these various memory units, the processing unit(s) 1310 retrieves instructions to execute and data to process in order to execute the processes of the invention. The processing unit(s) may be a single processor or a multi-core processor in different embodiments. Some instructions are passed to and executed by the GPU 1321. The GPU 1321 can offload various computations or complement the image processing provided by the processing unit(s) 1310.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive, integrated flash memory) as the permanent storage device 1335.

Other embodiments use a removable storage device (such as a floppy disk, flash memory device, etc., and its corresponding drive) as the permanent storage device. Like the permanent storage device 1335, the system memory 1320 is a read-and-write memory device. However, unlike storage device 1335, the system memory 1320 is a volatile read-and-write memory, such as random access memory. The system memory 1320 stores some of the instructions and data that the processor needs at runtime. In some embodiments, the invention's processes are stored in the system memory 1320, the permanent storage device 1335, and/or the read-only memory 1330. For example, the various memory units include instructions for processing multimedia clips in accordance with some embodiments. From these various memory units, the processing unit(s) 1310 retrieves instructions to execute and data to process in order to execute the processes of some embodiments.

The bus 1305 also connects to the input and output devices 1340 and 1345. The input devices 1340 enable the user to communicate information and select commands to the electronic system. The input devices 1340 include alpha-numeric keyboards and pointing devices (also called "cursor control devices"), cameras (e.g., webcams), microphones or similar devices for receiving voice commands, etc. The output devices 1345 display images generated by the electronic system or otherwise output data. The output devices 1345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 13, bus 1305 also couples electronic system 1300 to a network 1325 through a network adapter (not shown). In this manner, the computer can be a part of a network of computers (such as a local area network ("LAN"), a wide area network ("WAN"), or an Intranet), or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, even though many equations with many parameters were described above, one of ordinary skill will realize that the embodiments of the invention can be implemented based on other equations and other parameters. Thus, the above-described equations are provided only as a few exemplary solutions.

In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. One of ordinary skill in the art would understand that the invention is not to be limited by the foregoing illustrative details, but rather is to be defined by the appended claims.

The invention claimed is:

1. A method of displaying a selection of documents on a device, the method comprising:
    at the device, performing a privatized document identification and presentation procedure, by:
        identifying, at the device, a set of candidate documents sourced by a server different from the device;
        computing, at the device, a set of customized scores by computing a customized score for each candidate document by using a set of attribute scores for a set of document attributes, wherein the attribute scores are computed on the device based on previous interactions with documents previously displayed on the device;
        computing, at the device, a set of diversified customized scores by computing a diversified customized score for each candidate document by applying a diversification factor to at least a portion of the set of customized scores associated with candidate documents in a common group; and
        presenting a subset of candidate documents for display on the device based on the set of diversified customized scores.

2. The method of claim 1 further comprising receiving, at the device, the set of attributes for each candidate document.

3. The method of claim 1, wherein the sets of attributes for at least two different candidate documents include a different number of attributes.

4. The method of claim 1, wherein:
    a plurality of sets of attributes for a plurality of candidate document comprise topic identifiers; and
    a topic identifier associated with a document identifies a topic to which the document relates.

5. The method of claim 4, wherein
    each of a group of documents is associated with more than one topic identifiers that identify more than one topic to which the document relates; and
    generating the customized score for each document in the group comprises using topics scores for the document's associated topics, the topic scores of each document in the group computed on the device based on the previous interactions with previously displayed documents.

6. The method of claim 4, wherein more than one of the plurality of sets of attributes further comprise publisher identifiers, each publisher identifier in a set of attributes associated with the document identifying the publisher of the document.

7. The method of claim 1, wherein a plurality of sets of attributes for a plurality of document comprise visual attributes that relate to document features that visually engage a viewer to capture the viewer's attention.

8. The method of claim 1, wherein a plurality of sets of attributes for a plurality of document comprise visual characteristic attributes that express visual-capture features of the document that visually engage a viewer to capture the viewer's attention.

9. The method of claim 8, wherein the visual characteristic attributes comprise at least one of
   (i) attributes that express types of headlines provided by the documents;
   (ii) attributes that express types of headline photos used by the documents; and
   (iii) attributes that express a background color of headline photos used by the documents.

10. The method of claim 8, wherein the visual characteristic attributes comprise attributes that specify whether the document uses parallax or cinemagraph presentations.

11. A device comprising:
   a display screen for displaying documents;
   a set of processing units for executing instructions;
   a non-transitory machine readable medium storing a program comprising sets of instructions that, when executed by at least a portion of the set of processing units, cause the at least a portion of the set of processing units to perform a privatized document identification and presentation procedure, by:
      identifying, by the at least a portion of the set of processing units, a set of candidate documents sourced by a server different from the device;
      computing, by the at least a portion of the set of processing units, a set of customized scores by computing a customized score for each candidate document by using a set of attribute scores for a set of document attributes, wherein the attribute scores are computed on the device based on previous interactions with documents previously displayed on the device;
      computing, by the at least a portion of the set of processing units, a set of diversified customized scores by computing a diversified customized score for each candidate document by applying a diversification factor to at least a portion of the set of customized scores associated with candidate documents in a common group; and
      presenting a subset of candidate documents for display on the display screen of the device based on the set of diversified customized scores.

12. The device of claim 11, wherein a plurality of sets of attributes for a plurality of document comprise document metadata attributes provided by a set of servers that express qualities of headline characters or images of the document.

13. The device of claim 11, wherein a plurality of sets of attributes for a plurality of document comprise attribute pairs, each attribute pair associated with a document expressing two different attributes of the document.

14. The device of claim 11, wherein the device is a first device, wherein said attribute scores are further computed on the device based on previous interactions with documents previously displayed on a second device that is related to the first device.

15. The device of claim 14, wherein the first and second devices are devices associated with one account for receiving documents.

16. The device of claim 14, wherein the first and second devices are devices owned by one user.

17. The device of claim 11, wherein prior interactions comprise viewing summaries of the documents and selecting summaries of documents to view the documents.

18. The device of claim 17, wherein prior interactions further comprises sharing documents with other devices.

19. The device of claim 11, wherein the set of instructions for generating the customized score for a document comprises a set of instructions for aggregating the set of attribute scores for the set of attributes associated with the document.

20. A non-transitory machine readable medium storing a program for execution by at least one processing unit of a device, the program comprising sets of instructions that, when executed by the at least one processing unit, cause the at least one processing unit to perform a privatized document identification and presentation procedure, by:
   identifying, by the at least one processing unit, a set of candidate documents sourced by a server different from the device;
   computing, by the at least one processing unit, a set of customized scores by computing a customized score for each candidate document by using a set of attribute scores for a set of document attributes, wherein the attribute scores are computed on the device based on previous interactions with documents previously displayed on the device;
   computing, by the at least one processing unit, a set of diversified customized scores by computing a diversified customized score for each candidate document by applying a diversification factor to at least a portion of the set of customized scores associated with candidate documents in a common group; and
   presenting a subset of candidate documents for display on the device based on the set of diversified customized scores.

21. The non-transitory machine readable medium of claim 20, wherein the set of instructions for generating the customized score for a document comprises sets of instructions for:
   identifying, by the at least one processing unit, a default attribute score regarding a default level of interaction with any document on the device;
   reducing, by the at least one processing unit, each attribute score in the set of attribute scores by the default attribute score; and
   aggregating, by the at least one processing unit, the reduced attribute scores to generate the customized score.

22. The non-transitory machine readable medium of claim 21, wherein the set of instructions for aggregating the reduced attribute scores comprises a set of instructions for multiplying each reduce attribute score by a confidence weight value that expresses a quality of an interaction sample size.

23. The non-transitory machine readable medium of claim 21, wherein the set of instructions for aggregating the reduced attribute scores comprises a set of instructions for reducing contribution of a subset of attribute scores in an attribute score set when the attribute score set has too many scores for too many attributes.

24. The non-transitory machine readable medium of claim 20, wherein the program further comprises sets of instructions for:
   based on the generated customized scores,
      generating summaries for each document in the subset of documents;
      generating a layout of the summaries for display on the device.

25. The non-transitory machine readable medium of claim 20, wherein the program further comprises sets of instructions for:

generating summaries for each document in the subset of documents;

based on the generated customized scores, generating a layout of the summaries for display on the device.

* * * * *